United States Patent
Ueda et al.

(10) Patent No.: US 7,510,112 B2
(45) Date of Patent: Mar. 31, 2009

(54) DATA PROCESSING DEVICE, CONSUMABLE INFORMATION NOTIFICATION METHOD, STORAGE MEDIUM FOR STORING COMPUTER-READABLE PROGRAM, AND PROGRAM

(75) Inventors: Kosei Ueda, Chigasaki (JP); Satoko Oshima, Tokyo (JP); Rikio Shiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/451,935

(22) Filed: Jun. 13, 2006

(65) Prior Publication Data

US 2006/0283933 A1 Dec. 21, 2006

(30) Foreign Application Priority Data

Jun. 15, 2005 (JP) ............................. 2005-175187

(51) Int. Cl.
*G06F 19/00* (2006.01)
(52) U.S. Cl. ...................................... 235/375; 235/385
(58) Field of Classification Search ................. 235/492, 235/375, 431, 385; 358/1.14, 1.15; 399/24–30, 399/8–12
See application file for complete search history.

(56) References Cited

U.S. PATENT DOCUMENTS 5,594,529 A * 1/1997 Yamashita et al. ............. 399/8
2002/0073148 A1 * 6/2002 Haines et al. ............... 709/204
2004/0156489 A1 * 8/2004 Vishik et al. ........... 379/102.03
2005/0187744 A1 * 8/2005 Morrison et al. ............... 703/2
2005/0253887 A1 * 11/2005 Garrana et al. ................ 347/19

FOREIGN PATENT DOCUMENTS

JP 2002-196628 A 7/2002
JP 2004287943 A * 10/2004

OTHER PUBLICATIONS

English machine translation of JP 2004287943A, p. 3, 5.*

* cited by examiner

*Primary Examiner*—Daniel A Hess
(74) *Attorney, Agent, or Firm*—Canon U.S.A., Inc. I.P. Division

(57) ABSTRACT

As useful information on a consumable component used in an image forming apparatus, a user of the image forming apparatus is notified at an appropriate timing that this moment is in a production discontinuation period of a consumable agent. Service information including a support period for a consumable component consumed along with image formation of a printer is stored in a nonvolatile memory. A CPU determines whether or not a toner low notification timing that is status information on the consumable component from the printer is in a consumable goods discontinuation timing that is set as a particular period of the support period. A content of consumable component information that an output device should be notified of is configured to be changed on the basis of the determination result.

16 Claims, 16 Drawing Sheets

FIG. 7

| ADDRESS | CONTENT | |
|---|---|---|
| 1 | CARTRIDGE MANUFACTURING NUMBER (SERIAL No) | 703 |
| 2 | MODEL NAME | 704 |
| 3 | NEW CRG | 705 |
| 4 | TONER LOW | 706 |
| 5 | TONER OUT | 707 |
| 6 | PAGE COUNT | 708 |
| 7 | PIXEL COUNTER | 709 |
| 8 | TONER REMAINING AMOUNT | 710 |
| 9 | USE START DATE | 711 |
| 10 | LAST USE DATE | 712 |
| 11 | CARTRIDGE DISCONTINUANCE TIMING | 713 |
| 12 | CARTRIDGE DISCONTINUANCE NOTIFICATION TIMING | 714 |
| ⋮ | ⋮ | |

701 — ADDRESS column
702 — CONTENT column

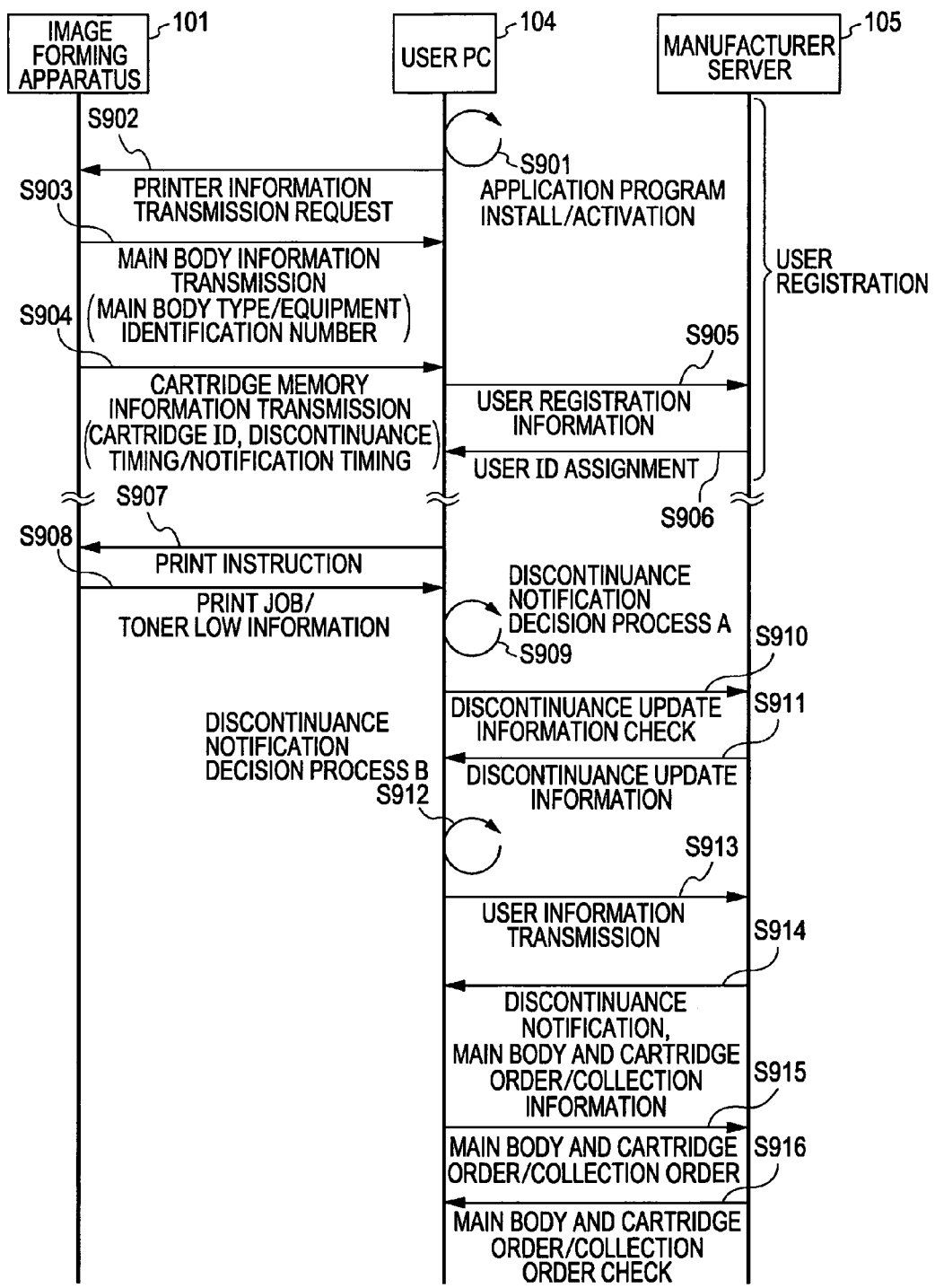

FIG. 10

| LBP-XXX PRINT DRIVER INSTALL |
|---|
| INSTALLMENT OF LASER PRINTER-XXX HAS BEEN COMPLETED. |
| OK |

INSTALLMENT IS FINISHED BY CLICKING OK BUTTON.
THEREAFTER, TEST PAGE IS OUTPUT.

FIG. 11

★IF YOU CLICK "CUSTOMER REGISTRATION BUTTON"
BELOW AND REGISTER YOURSELF,
WE WILL PROVIDE YOU INFORMATION
ABOUT NEARBY DISTRIBUTION OUTLET
AND COLLECTION CONTACT.

CUSTOMER REGISTRATION     CANCEL

■ CUSTOMER INFORMATION

| CRG NAME | EP-XX |
|---|---|
| MAIN BODY MANE | LBP-XXXX |

| CUSTOMER NAME | UEDA XX | TELEPHONE NUMBER | 03-XXXX-XXXX |
|---|---|---|---|
| | | FAX NUMBER | 03-XXXX-XXXX |
| COMPANY NAME | | E-mail | uedaabc@com. |
| ADDRESS (SETTING LOCATION) | SHIMOMARUKO, OHTA-KU TOKYO XXX-XXXX | | |
| DIVISION NAME | | NAME OF PERSON IN CHARGE | |

XXXX INC

X-X-X KONAN, MINATO-KU
TOKYO 108-XXXX

TEL 03-XXXX-XXX
FAX 03-XXXX-XXX

AFTER INPUT IS COMPLETED,
PLEASE CLICK REGISTRATION BUTTON

REGISTRATION — B11

CANCEL — B12

FIG. 13

■ CUSTOMER INFORMATION

| CRG NAME | EP-XX |
|---|---|
| MAIN BODY MANE | LBP-XXXX |

| CUSTOMER NAME | UEDA XX | TELEPHONE NUMBER | 03-XXXX-XXXX |
|---|---|---|---|
| COMPANY NAME | | FAX NUMBER | 03-XXXX-XXXX |
| ADDRESS (SETTING LOCATION) | SHIMOMARUKO, OHTA-KU TOKYO XXX-XXXX | E-mail | uedaabc@com. |
| DIVISION NAME | | NAME OF PERSON IN CHARGE | |

YOUR USER ID IS ASSIGNED.

| USER ID |
|---|
| XXXXXXXXXXXXX |

FIG. 16

◇ NEARBY DISTRIBUTION OUTLET — 1601
YOUR NEARBY XXXX CARTRIDGE DISTRIBUTION OUTLET IS AS FOLLOWS.

■ OHTA-KU, TOKYO

| SHOP NAME | ADDRESS OPENING HOUR | COLLECTION METHOD MAP |
|---|---|---|
| ■XXX ELECTRICS KAMATA SHOP Tel : 03-XXXX-XXXX | KAMATA, OHTA-KU TOKYO 9:00–17:30 | MAP |

◇ PURCHASE NET SHOPPING — 1602
PLEASE CHECK "SELECTION", CHOOSE NUMBER OF PURCHASE, AND CLICK "ADD TO SHOPPING CART". BY CLICKING "PRODUCT PHOTOGRAPH" OR "PRODUCT NAME", YOU CAN SEE DETAILED INFORMATION.

XXX-XXX COMPATIBLE CONSUMABLE GOODS

| PRODUCT PHOTOGRAPH | PRODUCT CODE | PRODUCT NAME | PRICE | SELECTION | NUMBER OF PURCHASE |
|---|---|---|---|---|---|
|  | XXXXXXXX | EP-XX TONER CARTRIDGE | 4,000 YEN | ☐ | 1 |

ADD TO SHOPPING CART — 1603

◇ COLLECTION
IN NET SHOPPING, WE CAN COLLECT USED CARTRIDGE UPON PRODUCT DELIVERY. PLEASE CLICK BUTTON BELOW.

| COLLECTION REQUESTED | COLLECTION NOT REQUESTED |

◇ DISCONTINUANCE ANNOUNCEMENT — 1605
THANK YOU VERY MUCH FOR USING OUR PRODUCT. CONSUMABLE GOODS SUPPLY DURATION IS 7 YEARS BEFORE DISCONTINUANCE. ALTHOUGH HAVING BEEN USED FOR LONG TIME, EP-XX CARTRIDGE EXPECTS TO STOP ITS SALES BY THE END OF 20XX. WE HOPE THAT YOU WILL UNDERSTAND THIS CIRCUMSTANCE. WE APPRECIATE IF YOU WOULD CONSIDER SWITCHING TO SUCCESSOR MACHINE.

OBJECT PRODUCT
XXX-XXX    XXX-XXX    XXX-XXX    INFORMATION

CONTACT ON THIS MATTER
CUSTOMER RESPONSE CENTER    INFORMATION
Tel : XX-XXXX-XXXX

NEW PRODUCT INFORMATION — 1604

FIG. 17

STORAGE MEDIUM SUCH AS FD/CD-ROM

| DIRECTORY INFORMATION |
|---|
| FIRST DATA PROCESS PROGRAM<br>PROGRAM CODE GROUP CORRESPONDING<br>TO STEPS OF FLOWCHART SHOWN IN FIG. 14 |
| SECOND DATA PROCESS PROGRAM<br>PROGRAM CODE GROUP CORRESPONDING<br>TO STEPS OF FLOWCHART SHOWN IN FIG. 15 |

MEMORY MAP OF STORAGE MEDIUM

DATA PROCESSING DEVICE, CONSUMABLE INFORMATION NOTIFICATION METHOD, STORAGE MEDIUM FOR STORING COMPUTER-READABLE PROGRAM, AND PROGRAM

BACKGROUND OF THE INVENTION

1. Field of the Invention

The present invention relates to an information output technology related to a consumable component used in an image forming apparatus.

2. Description of the Related Art

In an image forming apparatus such as a copier, a printer, a facsimile machine, toner or ink is used as a recording material. When such consumable goods are used up, replacement with new consumable goods is necessary. A technology for predicting the replacement timing is disclosed in Japanese Patent Laid-Open No. 2002-196628 and the like.

Then, an image forming apparatus main body is composed of various members and components, and those members and components have difference life spans in general. For example, in the case of the copier, constituent parts such as a photosensitive drum, a fixing device, an intermediate transfer belt, and various types of rollers have relatively short life spans, so it is necessary to replace those constituent members before the end of the main body life in general. Depending on a machine, a plurality of these parts are made into an integrated cartridge form, thereby reducing the replacing frequency and improving the customer's convenience.

Many of these consumable goods often need specific consumable goods corresponding to the main body model unlike a film for cameras or the like. This is because in order to develop higher quality apparatuses, manufacturers commonly develop apparatuses while conforming to characteristics of the consumable goods.

For this reason, these consumable goods will be purchased by the customers as long as the customers continue to use the main body machine even after the production and sales of the main body machine discontinue. Thus, the manufacturers and distributors of the main body machine of the image forming apparatus have a duty to sell these consumable goods.

However, when a newer model machine is introduced into the market, the older main body machine is either typically replaced or used less frequently as the life of the main body machine itself approaches the end year after year.

If the main body machines are not used, the sales amount of the consumable goods is reduced, and the manufacturing cost of the consumable goods is increased. For the manufacturer, the sales of the consumable goods become a large burden. For the customers, replacement to a new model at an appropriate timing is beneficial because the customers can typically buy a more modern machine with a higher quality and enhanced specifications. Also, in many cases, even the running cost is lowered.

From this standpoint, for discontinuation of the consumable goods, the manufacturer may announce for example, by providing information on the company's homepage, to the customers at an appropriate timing. Also, information about the discontinuation of the product is also sometimes incorporated in printed products describing the discontinuation information in a product package or labels the information on the product itself.

However, even when the manufacturer side adopts any one of the above-mentioned methods for the discontinuation notification indicating a planed product life, not all the users are necessarily provided with an appropriate notification at an appropriate timing. This is because the users of the discontinuation target machine do not necessarily check, for example, for such information on the company's homepage.

Also, even when the discontinuation information is put on the product, the users see only information deemed necessary at the time in many cases. In particular, in the case of the consumable goods, the same products are repeatedly purchased, the description content of the product package has less attention, and all the information on the product package are not necessarily read. Therefore, the users are likely to miss the discontinuation information.

Thus, in many circumstances, the methods of notifying the users of the discontinuation information at an appropriate timing are not realized, which may lead to a problem of a user's claim of lack of proper notification or the like when the consumable goods are discontinued while the users are not aware of the information.

For this reason, a system with which the users can be appropriately notified of the consumable goods discontinuation information at an appropriate timing is desired.

SUMMARY OF THE INVENTION

A data processing system is provided of which users can be appropriately notified of consumable goods discontinuation information at an appropriate timing.

According to an aspect of the present invention, a data processing device is provided which is configured to output a warning about supporting a consumable component used in an image forming apparatus. The device includes a first obtaining unit that obtains inherent information on the consumable component used in the image forming apparatus; a second obtaining unit that obtains current time information; and a warning controller that outputs a warning of the consumable component on the basis of the consumable component inherent information obtained by the first obtaining unit and the current time information obtained by the second obtaining unit.

According to another aspect of the present invention, the data processing device may further include an update unit that updates the consumable component inherent information, wherein the warning controller outputs the warning of the consumable component on the basis of the updated consumable component inherent information and the current time information.

According to another aspect of the present invention, the data processing device may further include a determining unit that determines print frequency, wherein the update unit updates the consumable component inherent information on the basis of a determination result of the determining unit.

According to yet another aspect of the present invention, a consumable information notification method is provided for outputting a warning related to a support for a consumable component used in an image forming apparatus. The method includes obtaining inherent information on the consumable component used in the image forming apparatus; obtaining current time information; and outputting a warning of the consumable component on the basis of the consumable component inherent information and the current time information.

According to another aspect of the present invention, the consumable information notification method may further include updating the consumable component inherent information, wherein the outputting step outputs the warning of the consumable component on the basis of the updated consumable component inherent information and the current time information.

Moreover, according to another aspect of the present invention, the consumable information notification method may further include determining print frequency, wherein the updating step updates the consumable component inherent information on the basis of a determination result of the determining step.

According to another aspect of the present invention, a computer-readable storage medium is provided which contains computer-executable instructions for executing consumable agent information notification. Here, the medium includes computer-executable instructions for obtaining inherent information on the consumable component used in the image forming apparatus; computer-executable instructions for obtaining current time information; and computer-executable instructions for outputting a warning of the consumable component on the basis of the consumable component inherent information and the current time information.

And furthermore, according to yet another aspect of the present invention, the computer-readable storage medium may further include computer-executable instructions for updating the consumable component inherent information, wherein the outputting includes outputting the warning of the consumable component on the basis of the updated consumable component inherent information and the current time information.

Still yet, according to another aspect of the present invention, the computer-readable storage medium may further include computer-executable instructions for determining print frequency, wherein the updating includes updating the consumable component inherent information on the basis of a determination result.

According to an aspect of the present invention, a data processing device is provided which is capable of communicating with an image forming apparatus. The device includes a first obtaining unit that obtains status information indicating a consumption status of a consumable component used in the image forming apparatus; a second obtaining unit that obtains support information including information regarding a support period of the consumable component in accordance with the status information; and a notification unit that notifies the support information.

According to another aspect of the present invention, wherein the second obtaining unit obtains the support information from a server on a network.

According to another aspect of the present invention, the data processing device may further include a transmitting unit that transmits a user ID for identifying a user to the server in accordance with the status information, wherein the second obtaining unit obtains the support information from the server on the basis of the user ID.

According to another aspect of the present invention, wherein the support information includes discontinuation information indicating a discontinuation timing of the consumable component.

According to another aspect of the present invention, wherein the support information includes at least one of distribution outlet information of the consumable component, collection information indicating a method of collection procedure for collecting the consumable component, and product information for performing direct purchase of the consumable component on a website.

According to yet another aspect of the present invention, a control method is provided for controlling a data processing device capable of communicating with an image forming apparatus. The method includes obtaining status information indicating a consumption status of a consumable component used in the image forming apparatus; obtaining support information including information regarding a support period of the consumable component in accordance with the status information; and notifying the support information.

According to another aspect of the present invention, a computer-readable storage medium is provided which contains computer-executable instructions for controlling a data processing device capable of communicating with an image forming apparatus. Here, the medium includes computer-executable instructions for obtaining status information indicating a consumption status of a consumable component used in the image forming apparatus; computer-executable instructions for obtaining support information including information regarding a support period of the consumable component in accordance with the status information; and computer-executable instructions for notifying the support information.

Other aspects and features of the present invention will be apparent from the following description taken in conjunction with the accompanying drawings, in which like reference characters designate the same or similar parts throughout the figures therein.

BRIEF DESCRIPTION OF THE DRAWINGS

FIG. 7 is a diagram for describing exemplary storage content stored in a CRG memory shown in FIG. 6.

FIG. 9 is a diagram for describing a discontinuation information notification sequence example of the data process system according to the present invention.

FIG. 10 shows an example of a printer driver install completion screen displayed on the user PC shown in FIG. 1.

FIG. 11 shows an example of a user registration screen displayed on the user PC shown in FIG. 1.

FIG. 12 shows an example of a user registration screen displayed on the user PC shown in FIG. 1.

FIG. 13 shows an example of user ID assignment screen information transmitted from the manufacturer server to the user PC shown in FIG. 1.

FIG. 16 shows an example of announcement screen data created by the manufacturer server shown in FIG. 1.

FIG. 17 is a diagram for describing an exemplary memory map of a storage medium for storing various data programs that can be read by the data process system according to the present invention.

DESCRIPTION OF THE EMBODIMENTS

Numerous embodiments, features and aspects of the present invention will now herein be described in detail with reference to the drawings. It should be noted that the relative arrangement of the components, the numerical expressions and numerical values set forth in these embodiments are not intended to limit the scope of the present invention unless it is specifically stated otherwise.

First Exemplary Embodiment

[Exemplary Configuration of an Information Processing System]

Figure 1:
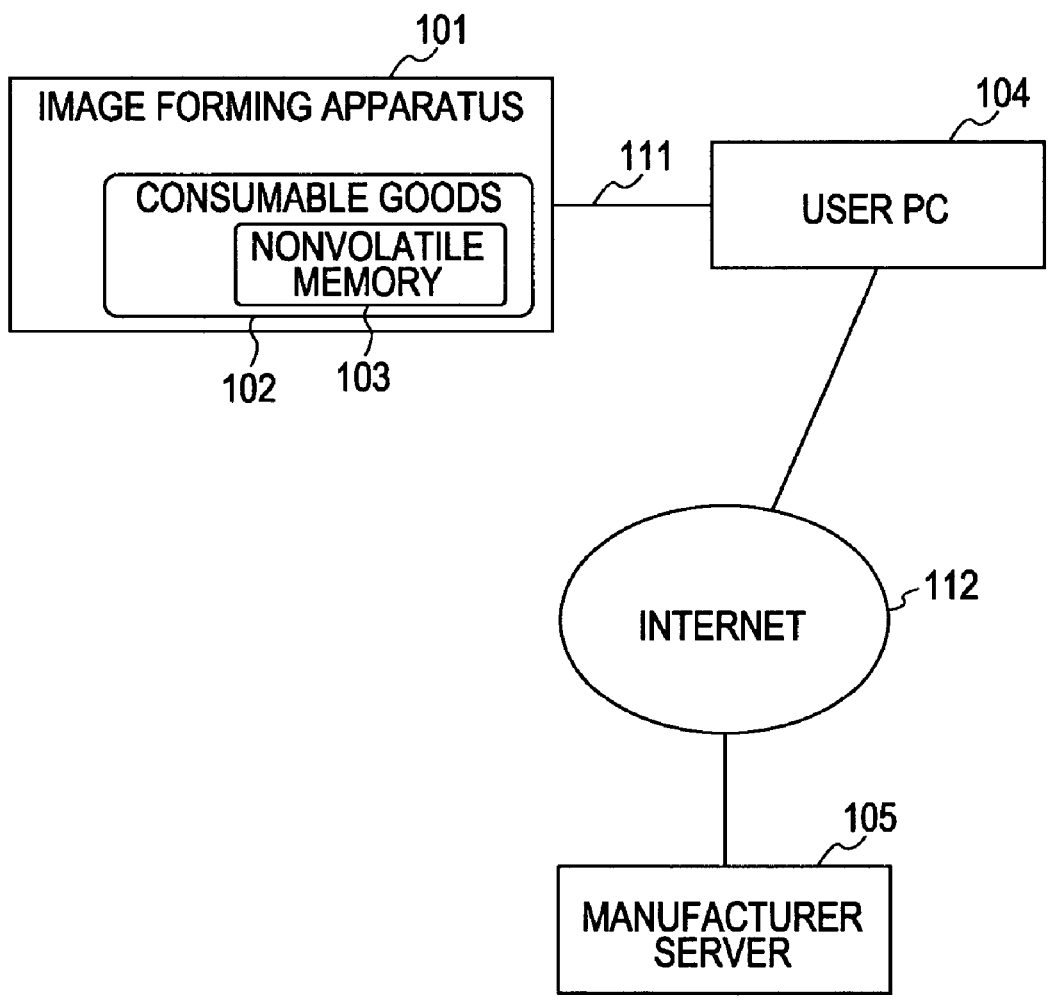
FIG. 1 is a block diagram for describing an exemplary configuration of an information process system according to a first embodiment of the present invention.

FIG. 1 is a block diagram for describing an exemplary configuration of an information processing system to which a data processing device can be applied according to a first embodiment of the present invention. Reference numeral 101 denotes an image forming apparatus used by a user. The image forming apparatus is connected to a personal computer 104 (hereinafter, may be described as a PC or a user PC) used by the user via a communication circuit 111 such as a local area network (LAN).

The user PC 104 is a device having functions of transmitting print data to the image forming apparatus 101, receiving information on consumable goods or the like to be described later from the image forming apparatus 101, and executing a process based on each application program.

The image forming apparatus 101 is designed to perform printing by installing consumable goods 102 such as a cartridge in which developing toner, a photosensitive drum, and the like are integrated with one another. For example, in the case of a cartridge for a consumable agent provided in an printer engine, the cartridge may be a toner cartridge or an ink cartridge depending on a model of the printer engine.

Furthermore, the consumable goods 102 are provided with a nonvolatile memory 103, whereby read and write of information on the nonvolatile memory 103 can be performed by a reading device installed in the image forming apparatus 101.

It should be noted that any printing technology such as a laser beam method or an inkjet method may be used as long as the above-mentioned image forming apparatus can form an image, and a use purpose such as a facsimile, copy, or a multifunctional device is not particularly limited. Also, regarding the consumable goods to be provided, various modes like a toner/drum separation type cartridge and an ink cartridge are conceivable other than the above-mentioned integrated cartridge, and these variations are not construed as limiting the present invention.

The user PC 104 is connected to an external server 105 for data management and data processing according to the present invention and connected to a communication circuit. The user PC 104 performs transmission and reception of data when necessary.

In the aforementioned data processing system, the user PC 104 can obtain an ID from the image forming apparatus 101 connected directly or via the communication circuit 111 such as a LAN, and perform information exchange with a manufacturer server 105 by using a predetermined protocol via the Internet 112.

For the information exchange, there are many options including a method of using electronic mail and a method of using file transfer protocol (FTP). In this embodiment, a method of using the hyper text transfer protocol (HTTP) is adopted for exemplary purposes.

It is further noted that in order to use the HTTP, the manufacturer server 105 is configured to function as a HTTP server and the user PC 104 is configured to function as a HTTP client. Since HTTP is a known technology, a description thereof is omitted herein. It should be noted that a plurality of protocols may be used in combination. Either method may be used as long as the communication produce secures a communication path for realizing the bidirectional data exchange. Furthermore, the manufacturer server 105 also has a database function, whereby user information transmitted from the user PC 104 and printer use information of the user can be stored.

Figure 2:
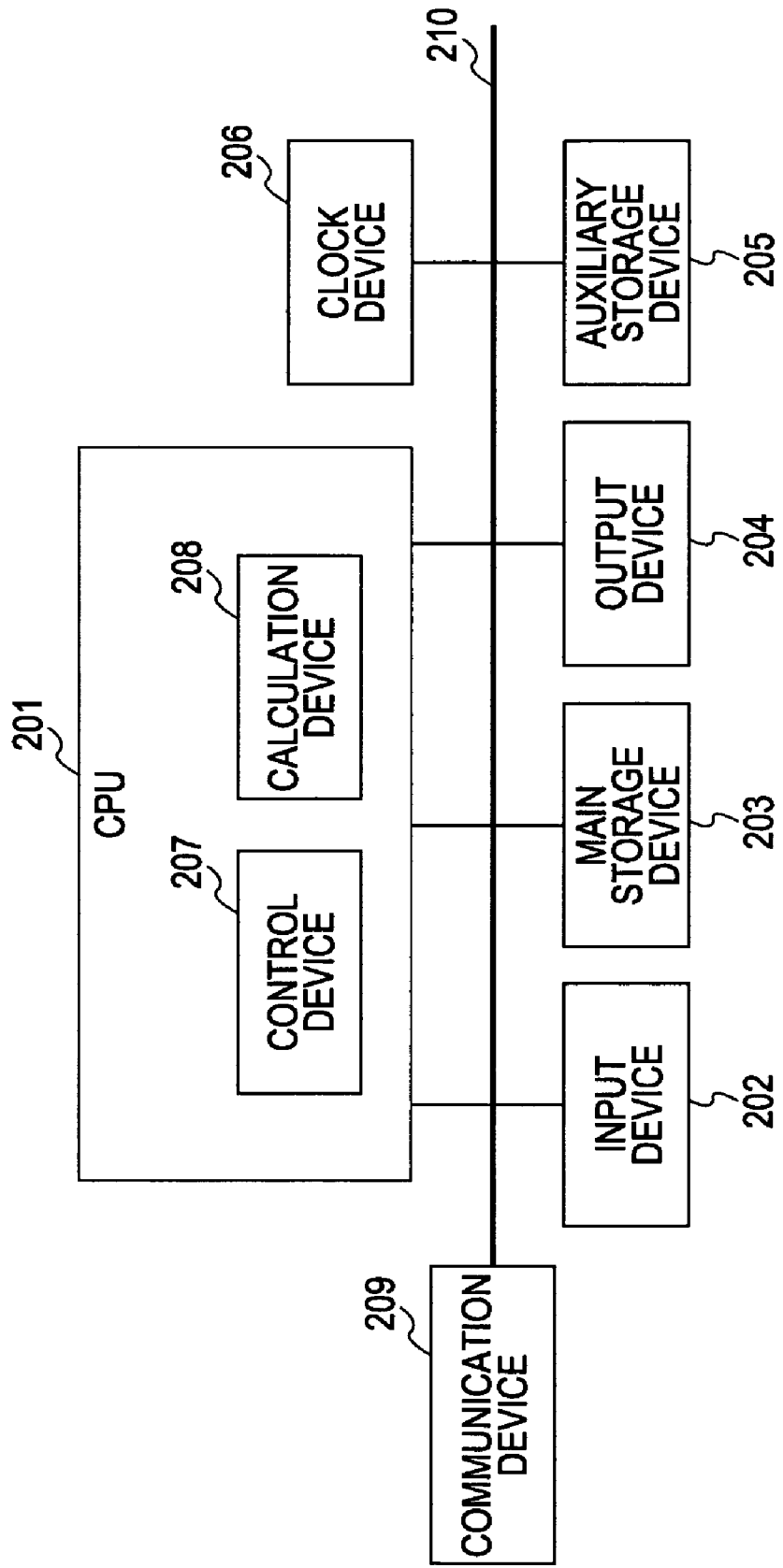
FIG. 2 is a block diagram for describing an exemplary configuration for a user and a manufacturer server of a data process system shown in FIG. 1.

FIG. 2 is a block diagram for describing exemplary configurations of the user PC 104 and the manufacturer server 105 in the data process system shown in FIG. 1. In such devices there are provided a central processing unit (CPU) 201, an input device 202, a main storage device 203, an output device 204, an auxiliary storage device 205, a clock device 206, a communication device 209, and an internal bus 210.

The CPU 201 is a processing device which is composed of a control device 207 for sending a command to the respective devices in the system and controlling the operation and a calculation device 208 for performing the calculation process on digital data. The CPU 201 operates in association with programs stored in the main storage device 203 and the auxiliary storage device 205.

Furthermore, the CPU 201 functions as a storage controller for storing information in the main storage device 203 and the auxiliary storage device 205 and also updates the information stored in the above-mentioned devices.

In particular, in accordance with a timing of a clock generated by the clock device 206, the control device 207 loads the data input from the input device 202 or the predetermined procedure (for example, a program or a software) into the main storage device 203, and sends the command based on the loaded content to the calculation device 208, which is caused to execute the calculation process. A result of this calculation process is transmitted to internal devices and external devices such as the main storage device 203, the output device 204, and the auxiliary storage device 205 on the basis of the control of the control device 207.

The input device 202 is adapted to input various data, examples of which may be in a form of a key board, a mouse, a pointing device, a touch panel, a mouse pad, a CCD camera, a card reader, a paper tape reader, or a magnetic tape device, or the like.

The main storage device 203 is called and regarded as a memory, which refers to all storage spaces that can be address for use to execute the commands in the processing device and the internal storage device. The main storage device 203, may be for example, composed of a semiconductor storage element. The semiconductor storage element composing the main storage device 203 includes a random access memory (RAM), a read only memory (ROM), or the like. The main storage device stores and holds the input program and data, and loads the stored and held data into, for example, a register in accordance with the instruction from the control device 207.

The output device 204 is adapted to output the calculation result or the like of the calculation device 208. For example, the output device 204 corresponds to a CRT, a display device such as a plasma display panel or a liquid crystal display, a printing device such as a printer, an audio output device, or the like.

The auxiliary storage device 205 is a component for supplementing the storage capacity of the main storage device 203, which is composed of, for example, a flexible disk, a hard disk drive, a CD-ROM, a CD-R, a CD-RW, or an MO made of a magnetic disk device, an optical disk device, or a semiconductor disk device. The auxiliary storage device 205 functions as storage unit for storing data for building various databases.

The communication device 209 is a device for performing communication with an external device, in which transmission and reception of data, digital-analog conversion, and the like are appropriately performed according to a connected network. Further, the above-mentioned devices are mutually connected via the internal bus 210 provided with an address bus or a data bus.

Figure 3:
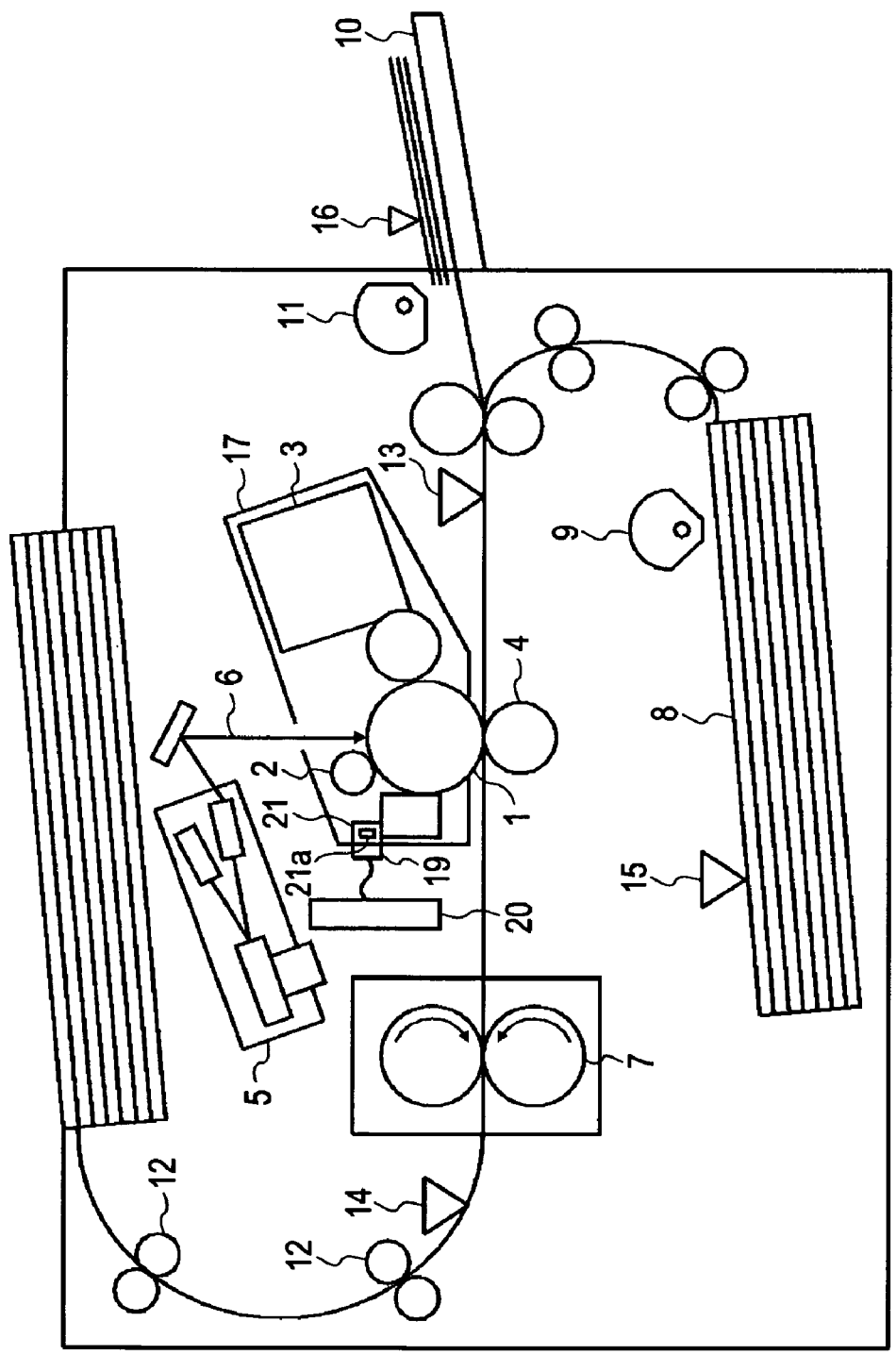
FIG. 3 is a cross-sectional view for describing an exemplary mechanical/structural configuration of an image forming apparatus shown in shown in FIG. 1.

FIG. 3 is a cross-sectional diagram for describing an exemplary mechanical configuration/structure of the image forming apparatus 101 shown in FIG. 1, which corresponds to an exemplary laser beam printer. Reference numeral 1 denotes a photosensitive drum for forming an electrostatic image, and reference numeral 2 denotes a charging roller for uniformly charging the photosensitive drum 1. Reference numeral 5 denotes an optical unit for scanning the photosensitive drum 1 with laser beam. Reference numeral 6 denotes the laser beam being emitted from the optical unit 5. Reference numeral 3 denotes a developer for developing the electrostatic image formed on the photosensitive drum 1 by the laser beam with toner.

Reference numeral 4 denotes a transfer roller charge device for transferring the toner image on the photosensitive drum 1 to a predetermined sheet. Reference numeral 7 denotes a fixing device for melting and fixing the toner on the sheet. Reference numeral 8 denotes a default cassette for placing printing sheet thereon. Reference numeral 9 denotes a default cassette sheet feed roller for picking up a sheet from the default cassette 8. Reference numeral 10 denotes a manual insertion tray. Reference numeral 11 denotes a manual insertion sheet feed roller. Reference numeral 12 (two places) denotes a discharge roller for discharging the sheet out of the machine.

Reference numeral 13 denotes a registration sensor for realizing a leading end registration of the conveyed sheet for printing. Reference numeral 14 denotes a sheet discharge sensor for checking whether or not the sheet is properly and completely discharged from the fixing device 7. Reference numeral 15 denotes a sensor for detecting the presence or absence of the sheet in the default cassette. Reference numeral 16 denotes a sensor for detecting the presence or absence of the manually inserted sheet.

Reference numeral 17 denotes a toner cartridge (equivalent to the consumable goods 102 of FIG. 1) in which the photosensitive drum 1, the charge roller 2, the developer 3, and the toner are integrated one another, and is detachably attached to the printer main body. Reference numeral 21 denotes a one nonvolatile memory mounted to the cartridge 17 (equivalent to the nonvolatile memory 103 of FIG. 1). The nonvolatile memory 21 has a function of prohibiting rewrite of a predetermined address content (a lock function section 21a shown in the drawing). A detailed description will be given below. Reference numeral 19 denotes a connector for performing signal exchange with the nonvolatile memory 21, and reference numeral 20 denotes a CRG memory control section for executing read and write of the data with respect to the nonvolatile memory the connector 19.

Figure 4:
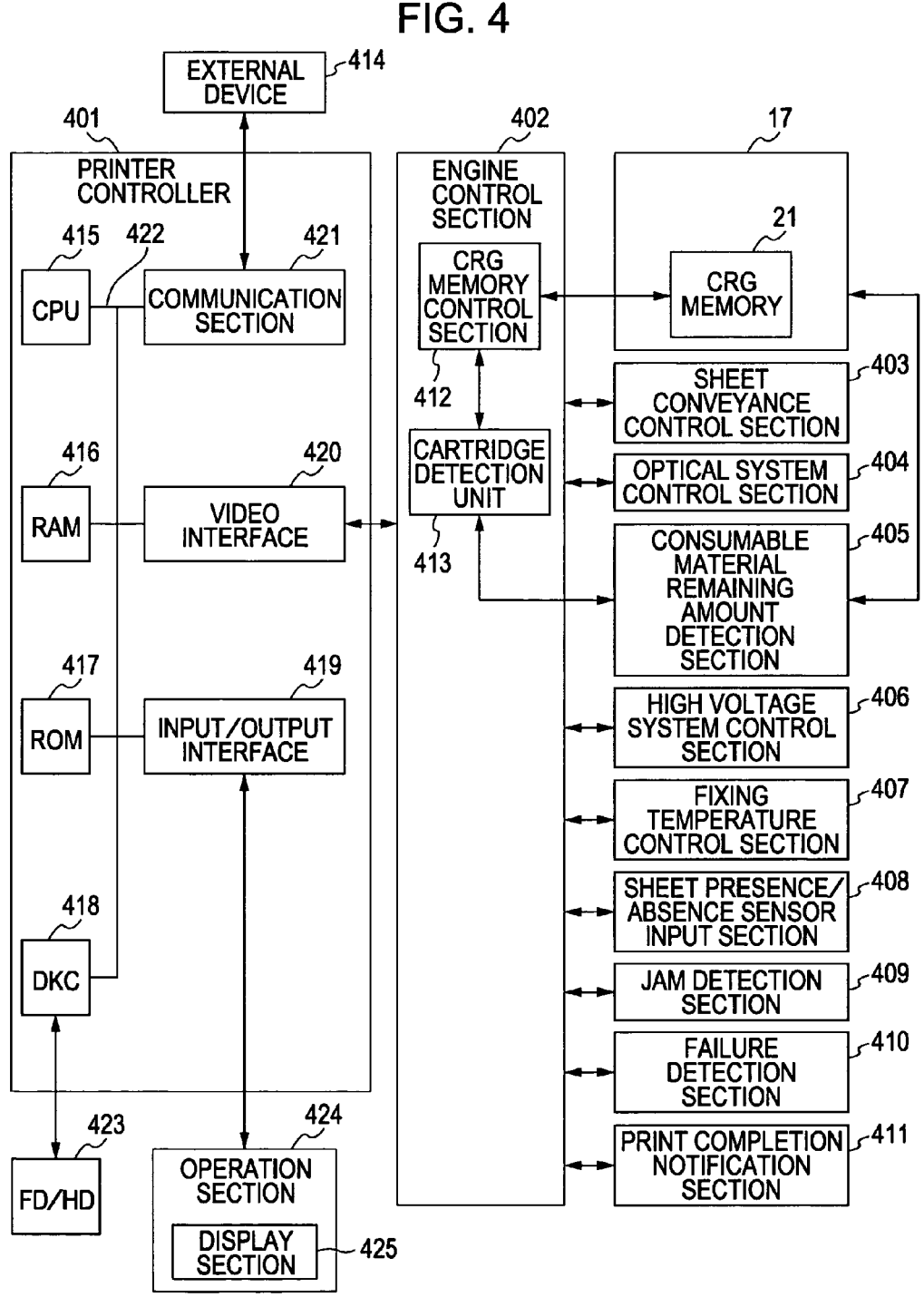
FIG. 4 is a block diagram for describing an exemplary system architecture of an image forming apparatus shown in FIG. 3.

FIG. 4 is a block diagram for describing an exemplary internal architecture of the image forming apparatus 101 shown in FIG. 3. Reference numeral 401 denotes a printer controller. Here, a communication section 421 performs transmission and reception of various data with an external device 414 such as a host computer (equivalent to the PC 104 of FIG. 1 or the like). Also, via a video interface 420, exchange of the image data, various control commands, and the like between the printer controller 401 and an engine control section 402 are performed.

A CPU 415 of the image forming apparatus has a function of governing accesses to various devices connected to a system bus 422 on the basis of the control program and the like stored in an external memory 423 such as a ROM 417 or a HD/FD. Also, the CPU 415 develops a page description language received from the external device 414 into the image data in a format with which the printer engine can perform the printing, and controls a function of outputting an image signal to the printer engine connected via the video interface 420 as the output information.

A RAM 416 is a RAM functioning as a main memory, a work area, and the like of the CPU 415. Memory controller (DKC) 418 controls accesses to the external memory 423 such as a hard disk drive (HD), Floppy (R) disk (FD), and the like for storing a boot program, various applications, font data, a user file, an editing file, and the like. An operation section 424 includes a display section 425 and a key board. The operation section 424 is adapted to provide information to an operator via an input/output interface 419 and receive an instruction input from the operator.

Reference numeral 402 denotes the engine control section for performing signal exchange with the printer controller 401 and control of each unit in the printer engine via a serial communication. Herein, a sheet conveyance control section 403 executes sheet conveyance from the sheet feed conveyance of the printing sheet to the sheet discharge after the printing on the basis of the instructions of the engine control section 402.

Then, an optical system control section 404 executes the scanner motor drive and the ON/OFF control for the laser on the basis of the instructions of the engine control section 402. It should be noted that although not shown in the drawing, there are also provided a pixel count section for counting the number of instruction signals (control signals) for turning ON the laser by the engine control section 402, etc.

On the other hand, a consumable material remaining amount detection section 405 controls a function of detecting the toner remaining amount of the consumable material in the cartridge 17 to transmits the information to the engine control section 402. Also, a high voltage system control section 406 executes the high voltage output necessary for electronic photographic processes such as the charging, the development, and the transfer on the basis of the instructions of the engine control section 402. A fixing temperature control section 407 controls the temperature of the fixing device 7 (see FIG. 3) on the basis of the instructions of the engine control section 402, and also detects a malfunction in the fixing device 7, etc. A sheet presence/absence sensor input section 408 transmits information on the presence/absence sensor for a sheet in a sheet feed section and a sheet conveyance path to the engine control section 402. Also, a jam detection section 409 detects a conveyance failure during the sheet conveyance. A failure detection section 410 detects a failure of a function section in the image forming apparatus 101.

A print completion notification section 411 detects that the printing is normally performed and notifies the engine control section 402 of that effect. Also, reference numeral 17 denotes a cartridge detachably attached to the printer engine for accommodating the consumable material such as the toner. Mounted in the cartridge 17 is a nonvolatile memory 21 that is a CRG memory capable of exchanging the data with the engine control section 402, with the structure where read or write of the data with respect to the engine control section 402 can be conducted.

Still referring to FIG. 4, a CRG memory control section 412 is provided in the engine control section 402 and has a function of reading the data with the nonvolatile memory 21 and rewriting the content of the nonvolatile memory 21. Reference numeral 413 denotes cartridge used amount detection unit provided in the engine control section 402. The cartridge used amount detection unit functions to determine the life span of the toner cartridge 17 on the basis of the information from the consumable material remaining amount detection section 405 and transmits the information to the CRG memory control section 412.

It is noted that the CRG memory control section 412 has a function of executing the read of the data (address) specified from the printer controller 401 and notifying the printer controller 401 of the read data via the video interface 420, in response to the read request of the nonvolatile memory 21 from the printer controller 401.

Also, the CRG memory control section 412 has a function of executing write of the data (address) specified from the printer controller 401 to via the video interface 420, in response to the read request of the nonvolatile memory 21 from the printer controller 401. Also, as a different mode, the present invention may be applied to a mode in which the printer controller 401 directly reads and writes the data with respect to the nonvolatile memory 21.

Figure 5:
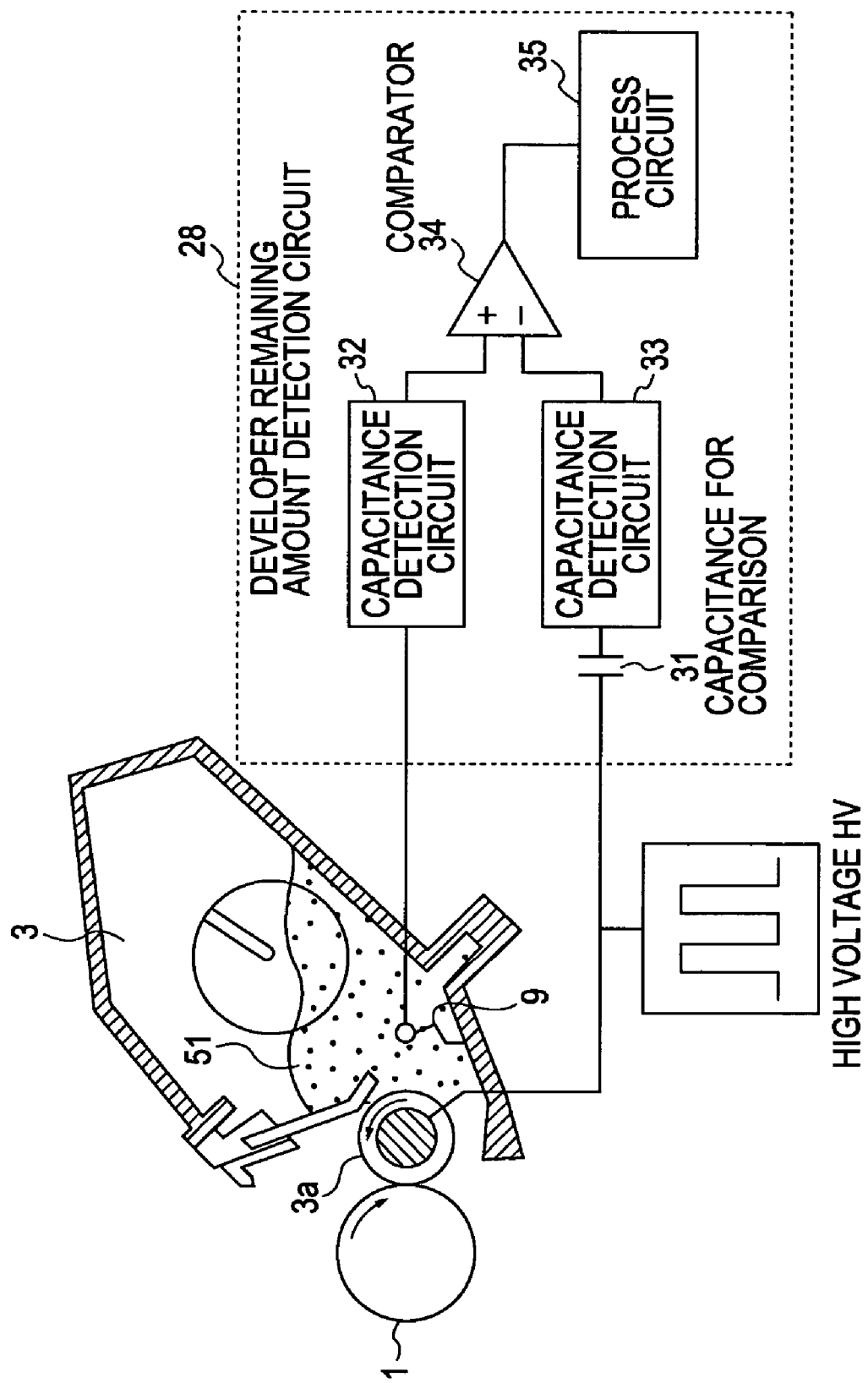
FIG. 5 is a diagram for describing an exemplary configuration of a consumable material remaining amount detection section shown in FIG. 4.

FIG. 5 is a diagram for describing an exemplary configuration/structure of the consumable material remaining amount detection section 405 shown in FIG. 4. Components shown in FIG. 5 that have the same function as components shown in FIG. 3 have the same reference number. The consumable detection section 405 includes a developer remaining amount detection member 9 having antenna shaped electrodes extended in the horizontal direction in the developer 3 (hereinafter, also simply referred to as an antenna) and a developer remaining amount detection circuit 28 provided in the device main body.

An alternate voltage (Vpp=about 1600 V) is applied between the antenna 9 and the development sleeve (also referred to as development roller) 3a from a power source. A capacitance between an electrode and the development sleeve calculated by a capacitance detection circuit 32 of the developer remaining amount detection section 28 and a capacitance 31 for comparison calculated by a capacitance detection circuit 33 are compared with each other by a comparator 34, and the result is output to a process circuit 35 in the form of a signal indicating the toner remaining amount of a toner 51.

Herein, when sufficient toner exists between the development sleeve 3a and the antenna 9, a potential detected by the capacitance detection circuit 32 is decreased. When the potential is lower than a potential detected from the capacitance detection circuit, the output from the comparator 34 becomes a low level. Therefore, detection of the toner remaining amount can be conducted on the basis of the output from the comparator. Further detail of the aforementioned is described in Japanese Patent Laid-Open No. 09-034239, so a detailed description is omitted here.

At this time, when the result of the output from the comparator 34 becomes the low level, it is determined that the developer remaining amount is equal to or less than a predetermined value. Then, the process circuit 35 equivalent to the engine control section 402 performs a process of converting the analog value to a digital value in predetermined steps, and a process of storing the result information in the nonvolatile memory 21 is performed by the CRG memory control section 412 (see FIG. 4).

Also, by adjusting the capacity of the capacitance 31 for comparison, it is possible to arbitrarily set the remaining amount of the consumable material when an empty signal should be detected.

Figure 6:
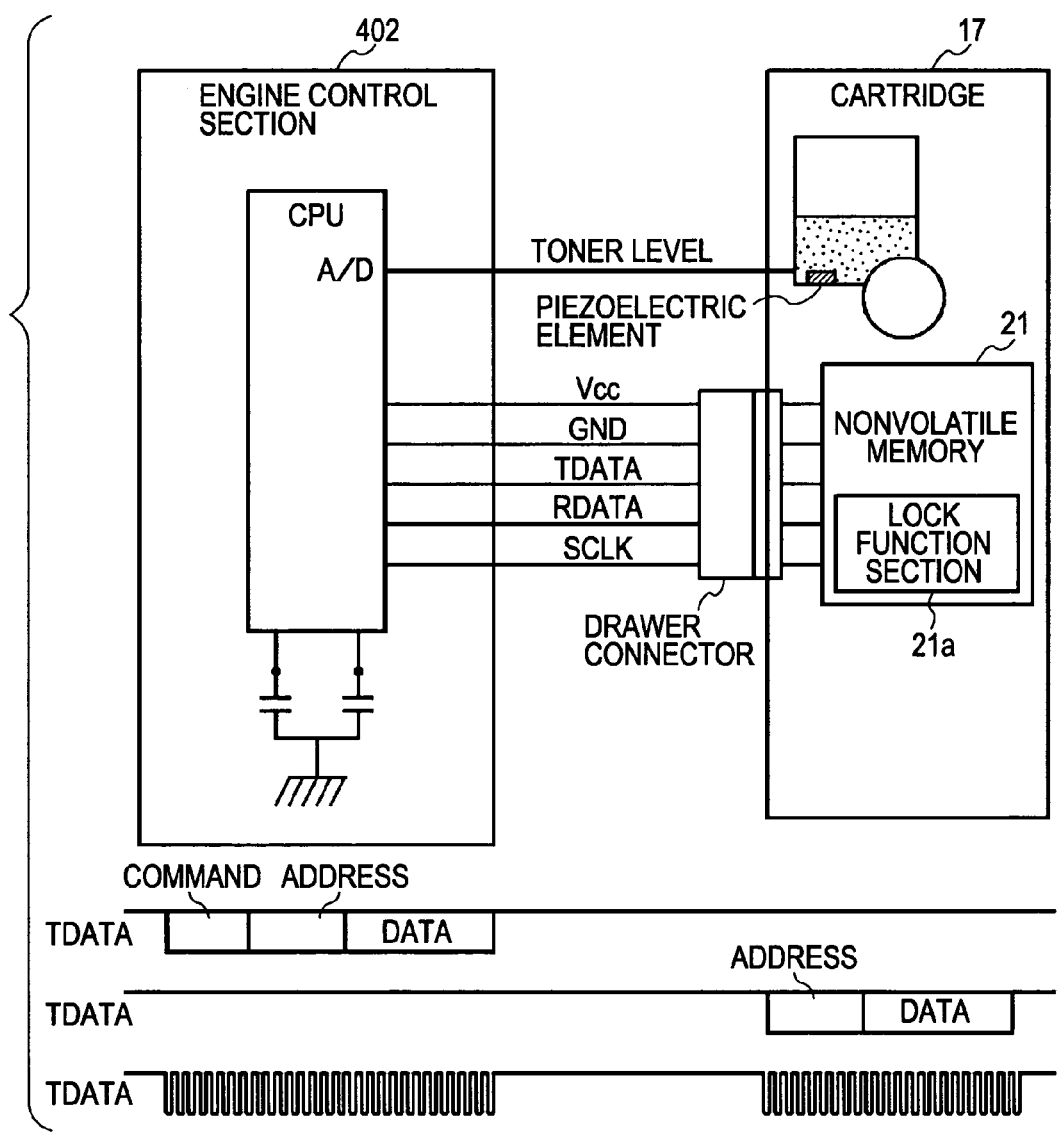
FIG. 6 is a diagram for describing an exemplary signal exchange between an engine control section and a nonvolatile memory shown in FIG. 4.

FIG. 6 is a diagram for describing an exemplary engine control section 402 and the nonvolatile memory 21 shown in FIG. 4, in which the same reference numerals are given to the same components as those in FIG. 4.

It should be noted that write/read of the information with respect to the CRG memory (the nonvolatile memory 21) in the respective flowcharts shown in FIGS. 13 and 14 described later is conducted on the basis of the system of FIG. 6.

In the engine control section 402, there is provided a CPU (equivalent to the CRG memory control section 412 of FIG. 4), which is connected to the nonvolatile memory 21 in the toner cartridge 17 via a drawer connecter with the serial communication circuit. Also, the toner remaining amount of the toner container in which the cartridge 17 is contained (the consumable material remaining amount) is detected in an analog manner by a piezoelectric device such as a piezoelectric element, and the analog value is read by an A/D conversion port of the CPU to be processed in a digital manner. Of course, with the system described in the above with reference to FIG. 5, the following example may be applied to this embodiment, in which the remaining amount of the consumable material is detected in an analog manner and the analog value is read by the A/D conversion port of the CPU to be processed in a digital manner.

The serial communication circuit is configured by signal lines including TDATA that is command data output from the engine control section 402 to the nonvolatile memory 21, RDATA that is a return status from the nonvolatile memory, and SCLK that is a synchronous clock. The TDATA is issued when the content of the nonvolatile memory 21 is read and rewritten by the engine control section 402. The instruction of read/rewrite is conducted with the use of a command bit.

When the address is read or rewritten, the data is transmitted in series. When the read is performed from the nonvolatile memory 21, a command indicating the read and an address thereof are issued.

As a result, the address and the data are returned from the cartridge. On the other hand, when the rewrite is performed, a command indicating the rewrite, an address thereof, and data that is used for the rewrite are issued.

Also, the nonvolatile memory 21 according to this embodiment has the read and rewrite functions described above, and also a function of prohibiting rewrite of the predetermined data inside the memory (hereinafter, referred to as the memory lock function section 21a).

Next, to manage the history of the consumable goods, an example of a status of the storage content stored in the nonvolatile memory 21 is shown in FIG. 7 which is a diagram for describing the storage content stored in the nonvolatile memory 21 shown in FIG. 6.

Reference numeral 701 denotes addresses where various pieces of information are stored and held, and reference numeral 702 denotes information content stored while being corresponding to each address.

Reference numeral 703 denotes a cartridge manufacturer number (serial No), which is information written in a manufacturing factory of the consumable goods cartridge, a distribution outlet, or the like. The cartridge manufacturer number stores information for identifying the cartridge. Reference numeral 704 denotes a model name indicating a type of the CRG, which is equivalent to the model name stored at the time of the CRG manufacture in the factory.

Reference numeral 705 denotes information indicating whether or not the cartridge 17 is new, which is equivalent to information for determining whether or not the cartridge is recycled as a used product after refill of the consumable material or replacement of the blade.

Reference numerals 706 and 707 denote flag information generated when a status of toner low or toner out occurs and the generated information is recognized by the image forming apparatus. According to this embodiment, the toner low is a signal generated when the remaining amount of the consumable material contained in the cartridge is equal to or less than a predetermined value (for example, the remaining amount is 25% or less), and the toner out indicates a status recognized by the image forming apparatus where the remaining amount of the consumable material is not much left or zero. Also, instead of using the toner low or the toner out, history information indicating how much the remaining amount of the consumable material is reduced like "the remaining amount is 10%" may be used.

It is noted that the flag information 706 and 707 are reset at the time of the shipment from the factory and also reset when, for example, the cartridge 17 is shipped as an authorized recycled product from the factory.

Reference numeral 708 denotes the number of output prints (page count), and reference numeral 709 denotes the number of pixel counts counted according to turning ON of the laser (pixel counter).

It is further noted that regarding the number of prints, a mode for classifying and storing the number for each sheet size is also conceivable. This mode is realized by the count process of the printer controller 401 or the engine control section 402 on the basis of information to be notified to the engine control section 402 and sheet size information included in the print data that is input to the printing device after detecting the situation where the printing by the print completion notification section 411 described in FIG. 4 is normally performed.

Also, reference numeral 710 denotes the remaining amount of the consumable material contained in the cartridge (the toner remaining amount), which is based on the information detected by the consumable material remaining amount detection section 405 or is equivalent to the information obtained by subtracting the remaining amount of the consumable material by the pixel count value of the pixel counter 709. In the case of FIG. 7, the information indicates the toner remaining amount.

Reference numeral 711 denotes information indicating a date and a time when the cartridge 17 for storing the consumable material is used for the first time (use start date). Reference numeral 712 denotes information indicating a date and a time when the cartridge 17 for storing the consumable material is used for the last time.

Furthermore, a cartridge discontinuation timing 713 indicating a manufacture discontinuation scheduled date of the same model (the model name 704) as the cartridge 17 and information indicating a cartridge discontinuation notification timing 714 for notifying the user of the discontinuation timing are stored.

It is also noted that the manufacture discontinuation timing 713 is predetermined such as 10 years after, for example, discontinuation of the main body using the cartridge. In this case, the information is written at the production time, the shipment time, or the like to a cartridge manufactured after the main body discontinuation execution or after the discontinuation date is determined.

However, before the decision of the main body discontinuation date or the like, when the cartridge discontinuation date is unclear, the data is not written. For the cartridge discontinuation notification timing 714, for example, a date with a sufficient period for notifying the user of the discontinuation such as a date of 2 year before the discontinuation date is written at the time of production at the factory or shipment.

Also, it is conceivable to adopt a mode of calculating the discontinuation notification timing by the application program PD of the PC 104 described later without information in the cartridge memory on the basis of the cartridge discontinuation timing 713.

It is further noted that information written to each cartridge is assumed to be the latest information at the time of the production, but if the discontinuation date is changed or the like, it is assumed even with the same model cartridge, depending on the cartridge manufacturer number, the written information may be varied.

[Exemplary Information Notification Control Process]

Hereinafter, on the basis of the above-mentioned system, an information notification control process according to the present invention will be described. It is noted that the process in the flowchart described below may be executed by the printer controller 401 or the engine control section 402. In the case where the printer controller 401 executes the process, the printer controller 401 is notified of the information obtained by the engine control section 402.

Now, a description will be given of an example of data stored in the databases of the user PC 104 and the manufacturer server 105 shown in FIG. 1. In the auxiliary storage device 205 such as a hard disk drive of the user PC 104 shown in FIG. 1, user ID/user password/user name/telephone number/fax number/company name/address/division name/name of person in charge are stored as "user information". Also, printer model/printer ID are stored as "printer information", cartridge model name/cartridge manufacture number (serial No)/cartridge replacement timing/total used number are stored as the consumable goods use history information.

Furthermore, the consumable goods discontinuation timing/the consumable goods discontinuation notification timing/the notification timing to the user related to the consumable goods discontinuation information are stored as the consumable goods discontinuation information.

Also, the number of prints/accumulation toner low are stored as "printer job history", and furthermore, the current time is stored as "other information". It should be noted that the current time does not need to include information on the second or minute time scale. For example, the current time includes information on the date and month scale and may not include information on the second or minute time scale as long as the current time can be used for the decision process described below. The information on the current time is sometimes called current time information.

On the other hand, in the auxiliary storage device 205 of the manufacturer server 105, user ID/user password/user name/ telephone number/fax number/company name/address/division name/name of person in charge/order/sales history/the consumable goods collection history are stored as "user information".

Also, printer model/printer ID are stored as "printer information", and cartridge model name/cartridge manufacture number (serial No)/cartridge replacement timing/total used number are stored as "consumable goods use history information". Furthermore, the consumable goods discontinuation timing/the consumable goods discontinuation notification timing/ the notification timing to the user of the consumable goods discontinuation information are stored as "consumable goods discontinuation information".

Furthermore, the number of prints/accumulation/toner low are stored as "printer job history", and the current time is stored as "other information". Also, distribution outlet information (distribution outlet, address . . . )/collection base station information (collection spot, address . . . ) are stored as "sales/collection base station information", and printer information (model, price, the number of stocks, and the like)/the consumable goods information (model, price, the number of stocks, and the like) are stored as "product information".

Hereinafter, with reference to a timing chart provided in FIG. 8, a description will be given of an aspect of the main body device, discontinuation timing of the consumable goods used in the main body device, and discontinuation information notification in the data process system according to the present invention. Reference numerals 801 to 804 denote main events generated in the life cycle from the sales start of the image forming apparatus to the discontinuation of the used consumable goods in a time series.

First, in the event 801, sales of the image forming apparatus main body and the consumable goods are started. In the event 802, production of the main body is discontinued. For example, when the supply period of the consumable goods is set 10 years after the discontinuation of the main body production, at the date in 10 years after the event 802, that is, in the event 804, the time reaches the consumable goods discontinuation timing.

In order that the user is notified of the discontinuation timing of the consumable goods discontinuation timing, a certain time is required. Therefore, the consumable goods discontinuation notification timing in the event 803 is set 2 years before the consumable goods discontinuation timing in the event 804, for example.

Figure 8:
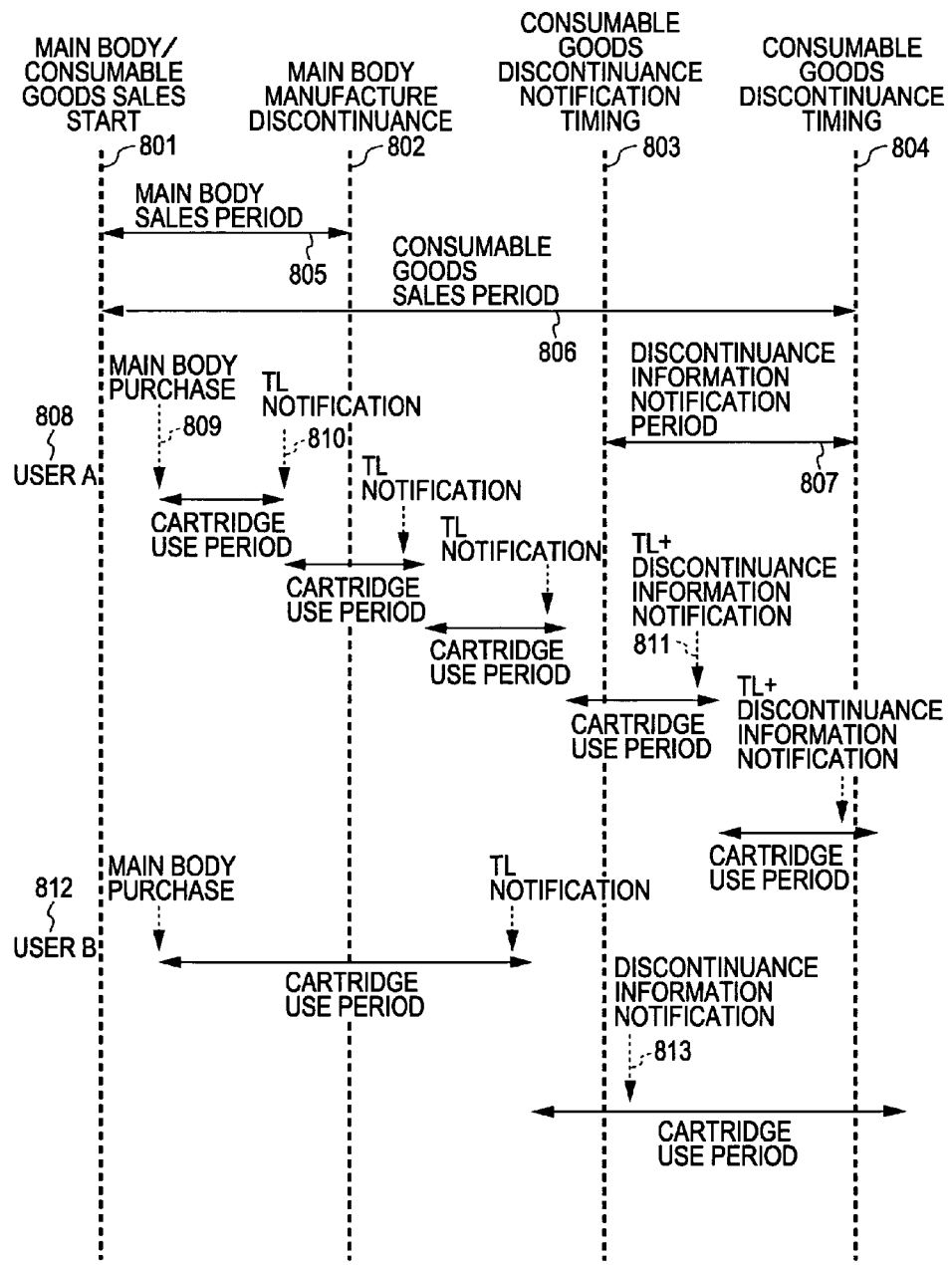
FIG. 8 is a timing chart for describing a main body machine in the data process system, a discontinuation timing and a discontinuation information notification timing of consumable goods used in the main body machine according to the present invention.

In the above setting, a main body sales period 805, a consumable goods sales period 806, a discontinuation information notification period 807 are set as periods as shown in FIG. 8.

Next, a timing for notifying a user 808 of the discontinuation information after the main body purchase will be described. The user 808 performs a main body purchase 809 (the cartridge may be in the same package of the main body, and if not, the cartridge is separately purchased), and starts using the cartridge necessary for the printing at the same time.

Then, the consumable component of toner, ink, or the like in the cartridge becomes low after being used for a certain period. After that, with the above-mentioned system, the image forming apparatus automatically performs TL (toner low) notification beginning at 810 for the user PC 104.

As a result, the user buys the new consumable goods or the like to newly install the next cartridge in the main body to start the usage and repeat the same operations. However, when the timing of the toner low notification has passed the consumable goods discontinuation notification timing 803, not only the toner low information notification but also the consumable goods discontinuance information notification are performed at the same time in a notification 811.

As a result, at the time where the user buys the next consumable goods or returns the used cartridge, it is possible for the user to find out the consumable goods discontinuation information. A normal user can find out the discontinuation notification information at an appropriate timing in this way.

However, there are some exceptional users whose print frequency is extremely low. This case will be described with a user 812. As shown in FIG. 8, in the case of the user 812 whose print frequency is extremely low, the consuming degree of the consumable goods such as toner per unit time is low, and therefore the usage period of one cartridge is long. For this reason, it is considerable that the timing for the toner low notification may not come between the consumable goods discontinuation notification timing 803 and the consumable goods discontinuation timing 804.

A discontinuance information notification 813 is performed at a timing other than the toner low by automatically determining the case of such a user through a method described below.

On the other hand, the discontinuation timing may be changed. For example, in a case where after consumable goods B installed in a main body device A are sold, the consumable goods B can be used in a difference main body device A1 that is started to be sold later, even after the main body device A is discontinued, as long as the main body device A1 is continued to be produced, the consumable goods B are not discontinued. In such a case, the discontinuance of the consumable goods B will be postponed from the originally scheduled timing.

Next, a system of implementing the above-mentioned exemplary discontinuation information notification timing with a computer will be described with reference to a diagram provided in FIG. 9. In the Figure, sequence examples of the image forming apparatus 101, the user PC 104, and the manufacturer server 105 constituting the data process system (from FIG. 1) are shown, where S901 to S916 represent timings.

[Exemplary User Registration]

Now referring to FIG. 9, the user purchases and sets the image forming apparatus 101, installs a program necessary for using a printer in the user PC 104 from a medium such as a CD-ROM or the WEB server or the like via the Internet, and activates the program to set the printer ready to use (S901). It should be noted that the following structure is adopted where an install completion screen shown in FIG. 10 is displayed on the display device of the user PC 104 when the install process is finished to notify the user of this effect, thereby making it possible to check the printing.

It is noted that the above-mentioned program is commonly called print driver or the like, with which a print command is issued from the user PC 104 to the image forming apparatus 101, image information is transmitted, or alternately print information (print completion information, print error information, or the like) is received from the image forming apparatus 101. It is noted that hereinafter an example of a printer driver is described, but this embodiment is not limited to this case. For example, the following function may be realized by a management utility for managing the image forming apparatus.

As in this embodiment, when the nonvolatile memory 103 is mounted to the cartridge 102 set in the image forming apparatus 101, the image forming apparatus 101 also has a function of receiving the memory information obtained from the nonvolatile memory 103 with the above-mentioned method.

According to the present invention, a program is mounted as an expansion function of the print driver for executing processes in which a necessary timing is determined and the user information is transmitted to the manufacturer server 105 via the communication circuit such as the Internet, information customized for each user is received from the manufacturer server 105, and the like. Hereinafter, this expanded print driver may be referred to as application program PD.

However, although not described in detail, this program may adopt another mode, for example, in which the print driver activates other application program such as a web browser when necessary, and transmission and reception of information with the manufacturer server 105 is performed.

Now referring to FIG. 9 again. When the above-mentioned application program PD is activated (S901), the print driver issues a transmission request of printer information to the image forming apparatus 101 connected to the user PC 104 (S902).

Then, the image forming apparatus 101 receiving the transmission request transmits the main body information (the main body model, the main body identification number, and the like) to the user PC 104 in accordance with the transmission request (S903). The user PC obtains inherent information on the consumable component currently mounted to the image forming apparatus, which is transmitted from the image forming apparatus 101. The thus obtained information is stored and held in the storage section of the PC 103.

All or part of the cartridge memory information is transmitted to the user PC 104 shown in FIG. 7 at the same timing if the cartridge 102 is set in the image forming apparatus 101 at this time or at a timing when the cartridge is set (S904). When the application program PD of the user PC 104 receives the printer information, screen information for the user registration (FIGS. 11 and 12) is transmitted to the output device 204 such as a display, which is built in or connected to the user PC 104.

FIGS. 11 and 12 show examples of a user registration screen displayed on the display device of the user PC shown in FIG. 1. It is noted that reference symbol B11 represents a registration button and reference symbols B2 and B12 represent cancel buttons.

On the registration screen shown in FIG. 11, when the user pressed a "customer registration" button displayed on the screen, the display is switched to a detail input screen shown in FIG. 12 by the control of the CPU 201 of the user PC 104.

When all the user information shown in FIG. 12 such as the cartridge name, the main body name, and the user name is input from an input device such as a key board (not shown), and then the registration button B11 is pressed, the application program PD of the user PC 104 transmits the input user information to the manufacturer server 105 (S905).

Then, the manufacturer server 105 receiving the user information registers the user information received from the user PC 104 in a user management database secured in the external storage device, for example, the holding storage device 205 such as the hard disk drive. At the same time the user ID is assigned, and the user ID, a password, an address of a dedicated website customized for the user, and a user ID assign screen information shown in FIG. 13 are transmitted to the user PC 104 (S906).

FIG. 13 shows an example of the user ID assign screen information transmitted from the manufacturer server 105 shown in FIG. 1 to the user PC, which is displayed on the display device of the user PC 104. At this time, in the case of addition of printers or the like, the user ID is already issued. Thus, only registration information on the manufacturer server 105 of the printer is transmitted to the user PC 104. With the above-mentioned steps, the user registration is completed.

[Exemplary Discontinuation Information Providing Process]

Next, an explanation of an exemplary process of the shift in Step S907 that is a consumable goods discontinuation information providing process after the user starts using the image forming apparatus 101 will be described.

When the user issues a print instruction to the image forming apparatus 101 on the basis of the application program PD of the user PC 104 (the printer driver), the application program PD transmits data such as the print instruction to the image forming apparatus 101 (S907).

The image forming apparatus 101 executes the print process and at the same time reads out information on the nonvolatile memory 103 mounted in the cartridge 102 set in the image forming apparatus 101 with the above-mentioned method. It is noted that this read is assumed to be performed at a timing of all the printing, but a method of reading (obtaining) the information is also conceivable when there is data read instruction data from the application program PD in Step S907. In this case, at a timing convenient for the user, information on the nonvolatile memory 103 can be obtained by the user PC 104.

Then, types of information to be read herein include data like cartridge manufacturer number (serial No)/model name/new CRG/toner low/toner out/page count/pixel counter/the toner remaining amount/use start date/last use date/cartridge discontinuation timing/cartridge discontinuation notification timing shown in FIG. 7 described above.

After such data read is finished, the image forming apparatus 101 transmits data along with print job information (also referred to as print history information) such as print completion information to the user PC 104 (S908). A detailed description will be given of how to use the print job information.

The user PC 104 receiving the print job from the image forming apparatus 101 and the read information from the nonvolatile memory 103, executes the judgment (or decision) process of information notification to the user, including whether or not the discontinuation notification is performed on the basis of the application program PD (S909).

Hereinafter, with reference to a flowchart shown in FIG. 14, a detailed description will be given of an exemplary decision process of information notification to the user, including whether or not the discontinuation notification is performed in S909.

Figure 14:
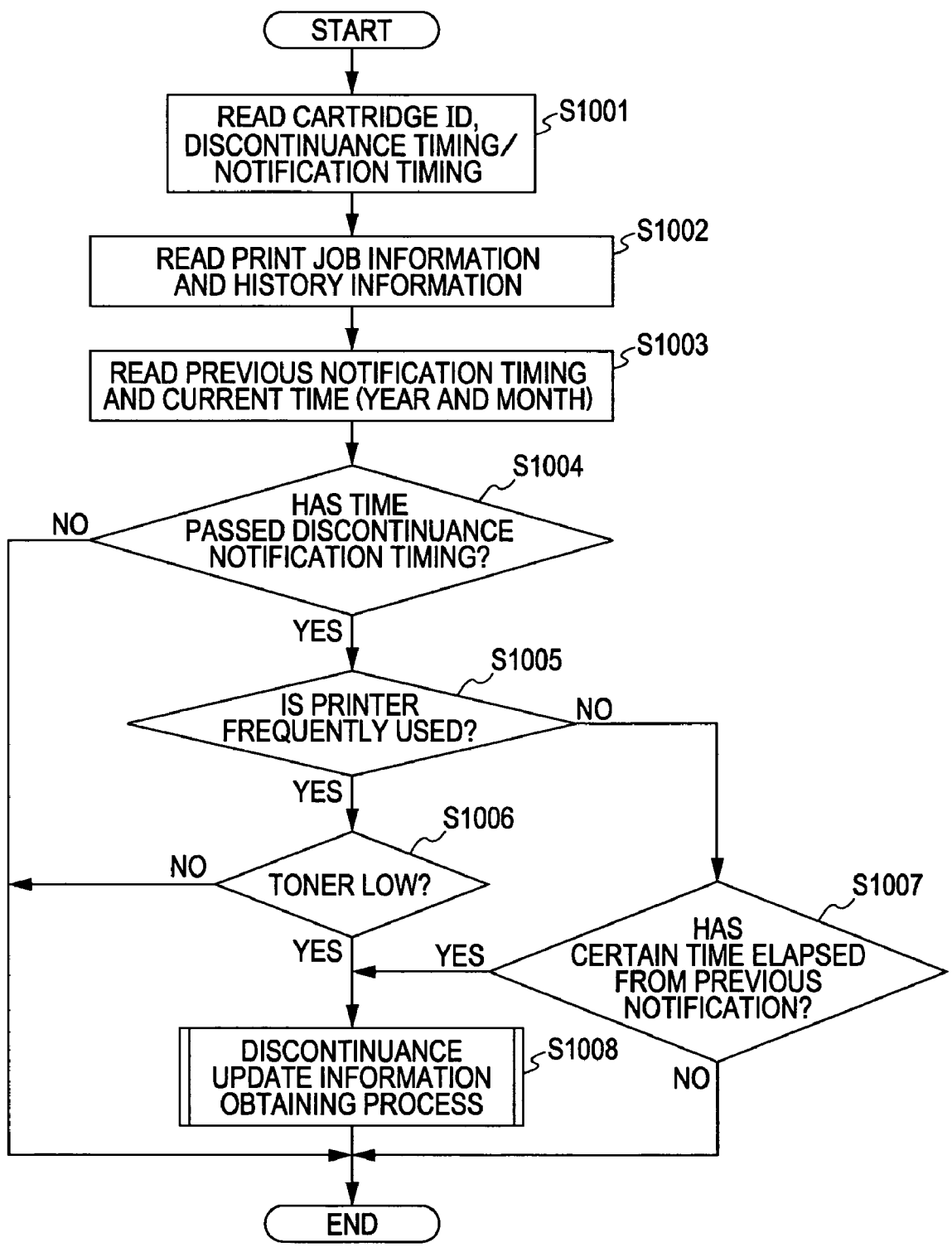
FIG. 14 is a flowchart showing an example of a first data operating procedure in the data processing device according to the present invention.

FIG. 14 is a flowchart showing an example of an exemplary first data operating procedure in the data processing device according to the present invention, which corresponds to the first discontinuation notification operating procedure (the operating procedure of Step S907 shown in FIG. 9) by the application program PD of the user PC 104 shown in FIG. 1. It is noted that S1001 to S1008 represent the respective steps, and the respective steps are realized when CPU in the user PC 104 loads the application program PD stored in the hard disk drive or the like of the into a RAM, etc.

The user PC 104 reads the information (cartridge ID, discontinuation timing, discontinuation notification timing) stored in the cartridge memory 103 and received from the image forming apparatus 101 into the main memory 203 of the user PC 104 (S1001). In the similar manner, the main body information (print job information, the print history information) is read in (S1002), and information stored in the application program PD such as "previous notification information" indicating the last timing for notifying the user of the discontinuation information and "current time (year and/or month)" is read in the main memory 203 (S1003). The "current time" may be year or month or day or hour.

Next, the application program PD of the user PC 104 determines whether or not the time passes the discontinuation notification timing (S1004). That is to say, the determination process is performed to determine whether or not "discontinuation notification timing" read in Step S1001 passes "current time" read in Step S1003. When the discontinuation notification timing does not pass the current time, this process is finished. As a result, the process in Step S907 shown in FIG. 9 is finished.

On the other hand, when the discontinuation notification timing passes the current time in Step S1004, the application program PD of the user PC 104 determines whether or not the image forming apparatus is frequently used (S1005).

It should be noted that there are considered several methods of determining whether or not the image forming apparatus is frequently used. The print history information read in Step S1002 may be used and cartridge exchange information may be used. For example, in the case of the former case, it is determined whether or not the number of printed sheets exceeds a threshold in a certain period (for example, whether or not the number of printed sheets exceeds 5,000 in the past year) on the basis of the history information of the print job. In the latter case, each time the cartridge is mounted, "cartridge manufacturer number (serial No)" transmitted from the image forming apparatus 101 to the user PC 104 and the transmission timing are stored in the application program PD. The transmission timing is regarded as occurrence of cartridge exchange, and it is determined whether or not the number of cartridge exchange times in a certain period is equal to more than a certain time (for example, whether or not the number of cartridge exchange times is 2 or more in the past year), whereby the decision can be made.

Then, it is determined whether or not the image forming apparatus is frequently used by using one of the above-mentioned methods. The user with high use frequency is equivalent to the user 808 described in FIG. 8 and the user with low use frequency is equivalent to the user 812.

When it is determined in Step S1005 that the user is the user with high use frequency, next it is determined whether or not the print job information includes the toner low information (S1006). If it is determined that the toner low information is not included, the process is finished. As a result, the process in Step S910 of FIG. 9 is also finished. It should be noted that the process in S1006 may be omitted. In other words, irrespective of the occurrence of the toner low, if it is determined that the time has passed the discontinuance notification period, and in response to the determination in which the printer is frequently used, the process may shift to S1008.

On the other hand, in Step S1006, when it is determined that the toner low information is included, the process proceeds to the discontinuance update information obtaining process (S1008).

Furthermore, when it is not determined in Step S1005 that the user is the user with high use frequency, determination of whether "a predetermined time elapses from the previous notification?" is conducted (S1007). This process is for comparing "previous notification timing" read in Step S1003 and "current time" with each other to determine whether or not a predetermined time (for example, one month) has passed.

If it is determined that the predetermined time has passed, the process in Step S1008 described above is performed. On the other hand, when it is determined that the predetermined time has not passed, the process is finished. As a result, the process in Step S907 is finished.

Now, returning to FIG. 9, when the process of discontinuation notification decision process A (S909) is finished, a process similar to the above-mentioned discontinuance update information obtaining process is performed (S1008).

The user PC 104 accesses the address of the dedicated website in the user the manufacturer server 105 obtained at the registration and registered in the application program PD to issue a discontinuation timing latest information obtaining request (S910). In response to the obtaining request, the manufacturer server 105 transmits the latest information on the discontinuation timing registered in the website to the user PC 104 (S911).

As a result, it is possible to avoid a claim from the user due to lack of discontinuance notification to the user by way of thorough discontinuance notification of the consumable goods by the manufacturer and the distribution outlet.

Also, with the notification at an appropriate timing, preliminarily purchase of the consumable goods and repurchase of the main body can be promoted. Here, it is noted that the processes in S910 and S911 may be performed at an arbitrary timing in response to the instruction to the application program PD from the user or through the automatic decision by the application program PD.

Hereinafter, a reason for obtaining the latest information on the discontinuation timing will be described. The latest timing information on the discontinuation timing is stored in the auxiliary storage device 203 of the manufacturer server 105. As the discontinuation timing information stored in the nonvolatile memory 103 of the cartridge 102, information at the time of producing or shipping the cartridge 102 is registered in the nonvolatile memory 103. As described above, the discontinuation timing may be changed, and therefore there is a possibility that the information is updated before the user uses up the cartridge 102. Thus, by obtaining the latest information in this stage, the information accuracy is improved.

Now referring back to FIG. 9 again. The user PC 104 receiving the latest information on the discontinuation timing next performs a discontinuation timing decision process B at S912.

Figure 15:
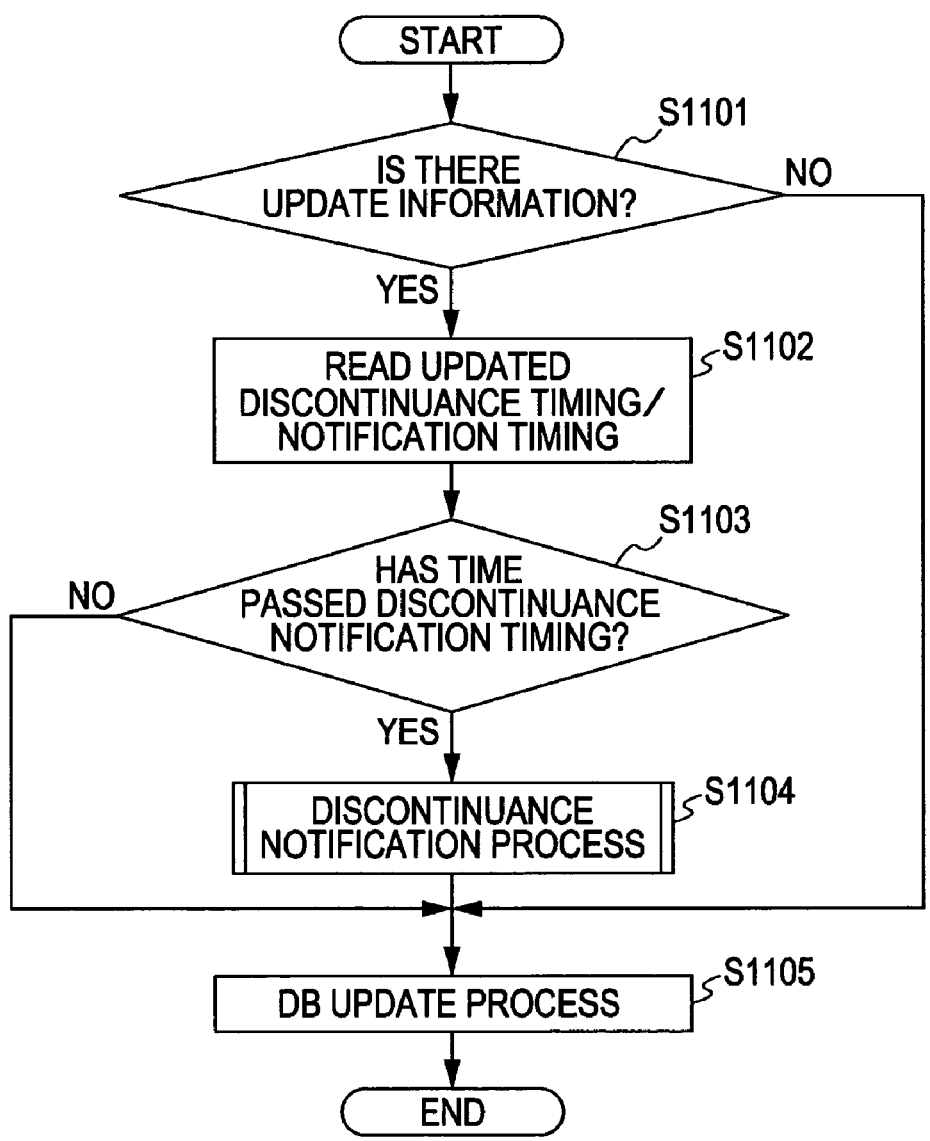
FIG. 15 is a flowchart showing an example of a second data operating procedure in the data processing device according to the present invention.

FIG. 15 is a flowchart showing an example of an exemplary second data operating procedure in the data processing device according to the present invention, which corresponds to the first discontinuation notification operating procedure (the operating procedure of Step S907 shown in FIG. 9) by the application program PD of the user PC 104 shown in FIG. 1. It should be noted that S1101 to S1105 represent the respective steps. The respective steps are realized when the CPU 201 of the user PC 104 loads the application program PD stored in the auxiliary storage device 205 such as the hard disk drive into a RAM or the like.

First, the user PC 104 checks whether or not the update information is on the memory (the auxiliary storage device 205) in Step S1101. When it is determined that the update information is on the memory, the updated discontinuation timing information and notification timing information are read (S1102).

Then, it is determined whether or not the discontinuation notification timing has passed the current time (S1103), and when it is determined the discontinuation notification timing has passed the current time, a discontinuation notification process described below is performed (S1104), and the process proceeds to Step S1105.

On the other hand, when it is determined in the process in Step S1101 that there is no update information or when it is not determined in Step S1103 the discontinuation notification has passed the current time, the process proceeds to Step S1105. The database in the auxiliary storage device 205 of the user PC 104 is updated, and the process that is the process in Step S912 corresponding to FIG. 9 is finished.

Next, FIG. 9 will be described again. In the process of Step S912, that is, in Step S1104, when the discontinuation notification process is selected, the user PC 104 transmits the user information to the manufacturer server 105.

The user information includes the user ID, the printer ID, the cartridge ID, the cartridge remaining amount information, and the like. Then, the CPU 201 of the manufacturer server 105 receiving the user information creates screen information to be displayed on the user PC 104 on the basis of the received user information and use history information on the printer and the consumable goods previously registered or accumulated in the auxiliary storage device 205 and the like.

FIG. 16 shows an example of an announcement screen data created by the manufacturer server 105 shown in FIG. 1. As a specific example of the screen information in this embodiment, a part or all of information useful for the user including distribution outlet information 1601 for allowing the user to purchase the consumable goods, product information 1602 in the case of direct purchase on the website, collection information 1603 indicating a method of collection procedure for collecting the consumable goods, replace information 1604 for repurchase of the printer main body device, and the like is displayed while being customized for each user along with the consumable goods discontinuation information 1605 indicating the discontinuation timing of the consumable goods, the contact detail, and the like.

In this case, the consumable goods discontinuation information is particularly important information. Therefore, for example, the display thereof is made highlighted by flashing with the use of Java Script or the like, whereby information communication becomes more effective.

Furthermore, as another mode, a method of displaying the consumable goods discontinuation information 1605 before or after a screen for displaying the distribution outlet information 1601, the product information 1602, the collection information 1603, and the replace information 1604 is also conceivable.

In this case, various methods are available. For example, after displaying the respective screens, a method of proceeding to the next screen by preparing a button for proceeding to the next screen on the screen or a method of automatically proceeding to the next screen after elapsing a certain period may be employed. In either case, it is importance to appropriately perform the display so that the user will not miss the consumable goods discontinuation information 1605.

As an example for customizing the information for each user, only the discontinuation timing of the consumable goods related to the printer owned by the user is displayed, information on the collection base station in accordance with the user's address, and the like are proposed. Any of the aforementioned methods are known technology, and further, the required effect can be realized by using the methods in combination. Therefore, a detailed description will be omitted.

Then, as shown in FIG. 9, the created screen information is transmitted from the manufacturer server 105 to the user PC 104 (S914), the user PC 104 receiving the screen information displays the screen information on the output device 204 such as the display shown in FIG. 2 by the control of the CPU 201. With this process, a warning process based on the consumable component inherent information obtained from the image forming apparatus 101 and the thus obtained current time information is realized.

Then, the user places an order of the main body, the discontinuation timing of the consumable goods, or the like when necessary. Although a detailed screen shift of the respective screens is not shown in the drawing, requisite items such as the order product, the order number, and the inquiry matter are input, and then a transmission button is pressed for transmitting the information to the manufacturer server. The user PC 104 transmits order collection information and the like to the manufacturer server 105 (S915), the manufacturer server receiving the information performs a necessary process on the order and collection. The process result is then transmitted to the user PC 104 (S916), and the process is finished.

It is noted that the processes from Steps S913 to S916 are similar to the discontinuation notification process in Step S1104 shown in FIG. 15. In other words, the processes in Steps S913 to S916 shown in FIG. 9 are performed in accordance with the case where the process in Step S1104 of FIG. 15 is performed. In other cases, this process is not performed.

It is further noted that, although not shown in the flow, for example, when the screen shown in FIG. 16 is not displayed in the process flow shown in FIG. 15 and also when the application program PD receives the toner low information, a process of displaying only sections indicating the order and collection information of FIG. 16: the distribution outlet information 1601, the product information 1602, the collection information 1603, and the replace information 1604 on the display of the user (that is, the discontinuation notification section 1605 is not displayed).

With the above steps, it is possible to reliably notify the user of the consumable goods discontinuation information at an appropriate timing.

According to this embodiment, the description has been given of the case where a representative example of the image forming apparatus is the printer and a representative example of the discontinuation timing of the consumable goods is the toner cartridge (a part of the cartridge is referred to as CRG). However, other device and consumable goods can be used as long as the consumable goods discontinuation timing information can be notified in a similar mode of the present invention.

Second Exemplary Embodiment

In the above-mentioned embodiment, the description has been given of the case where the user PC 104 performs the consumable goods discontinuation timing notification process. However, if the image forming apparatus 101 alone realizes the function, by implementing the above-mentioned notification process function in the image forming apparatus 101, the image forming apparatus 101 may be configured so that the image forming apparatus 101 itself executes the control on the consumable goods discontinuation timing notification.

Third Exemplary Embodiment

In the above-mentioned embodiment, the description has been given of the case where the roles (processes) of the image forming apparatus 101, the user PC 104, the manufacturer server 105 are distinguished one another, but the roles of the respective apparatuses are not limited to the above-mentioned embodiment.

For example, the manufacturer server 105 may execute the decision process in Step S909 or S912. In this case however, the manufacturer server is notified of the information necessary for the decision from the user PC. As the information necessary for the decision, for example, the cartridge discontinuation timing 713 shown in FIG. 7, the cartridge discontinuation notification timing 714, and the previous notification timing read in S1003 can be employed.

Also, the printer may execute a part or all of various processes of the user PC. In this case, the user PC 104 becomes unnecessary, and the various processes are executed by the image forming apparatus 101, thereby realizing this structure. In this way, this embodiment can be realized by various systems.

Fourth Exemplary Embodiment

Hereinafter, with reference to a memory map shown in FIG. 17, a description will be given of an exemplary configuration of the data process programs that can be read by the data process system according to the present invention. That is to say, FIG. 17 is a diagram for describing a memory map of a storage medium for storing various data process programs that can be read by the data process system according to the present invention.

It is noted that although not shown in the drawing, information for managing a program group stored in the storage medium, for example, version information, creator, or the like is stored and at the same time, information depending on the OS or the like on the program read side, for example, an icon for identifying and displaying the program or the like may also be stored.

Furthermore, data depending on the various programs are also managed by the above-mentioned directory. Also, a program for installing the various programs in the computer, an extracting program used in the case where a program to be installed is compressed, and the like may also be stored.

The functions shown in FIGS. 14 and 15 according to this embodiment may be implemented by a host computer on the basis of a program that is externally installed. Then, in that case, the present invention may also be applied to the following example where an information group including the program is supplied to an output device with a storage medium such as a CD-ROM, a flash memory, or a FD, or supplied from an external storage medium via a network.

As in the above case, when the storage medium for storing a software program code for realizing the above-mentioned function of the embodiments is supplied to a system or a device, and a computer (alternatively, a CPU or an MPU) in the system or the device reads and executes the program code stored in the storage medium, it is of course possible to achieve an aim of the present invention.

In this case, the program code itself read out from the storage medium realizes a new function of the present invention, whereby the storage medium for storing the program code constitutes the present invention.

Thus, as long as being provided with the program function, any mode of the program is accepted such as an object code, a program executed by an interpreter, or a script data supplied to the OS.

A flexible disk, a hard disk drive, an optical disk, an opto-magnetic disk, an MO, a CD-ROM, a CD-R, a CD-RW, a magnetic tape, a nonvolatile memory card, a ROM, a DVD, and the like may be used as the storage medium for supplying the program, for example.

In this case, the program code itself read out from the storage medium implements the above-mentioned functions of the embodiments, whereby the storage medium for storing the program code constitutes the present invention.

In addition, as a method of supplying the program, a browser of a client computer is used to connect to a website on the Internet. From the website, the computer program itself of the present invention or a compressed file including an automatic install function is downloaded to a recording medium such as the hard disk drive, whereby the program can be supplied. Also, the program code constituting the program of the present invention is divided into a plurality of files, and the respective files are downloaded from different websites, thereby implementing the program. In other words, a WWW server, an FTP server, and the like that allow a plurality of users to download the program file for causing the computer to realize the function process of the present invention are within the scope of the present invention.

Also, the program file of the present invention is enciphered to be stored in the storage medium such as a CD-ROM for distribution to users, and users satisfying a predetermined condition are allowed to download key information for decipher from a website via the Internet. Then, the key information is used for executing the enciphered program file, and the program file is installed in the computer, thereby realizing the present invention.

Also, as the program code read out by the computer is executed, not only the case where the above-mentioned functions of the embodiments are realized, but also the case where an operation system (OS) or the like running on the computer executes a part or an entirety of the actual processes on the basis of the instructions of the program code and the above-mentioned functions of the embodiments are realized with the processes, are of course within the scope of the present invention.

Furthermore, after the program code read out from the storage medium is written in a memory provided in a function expansion board inserted in the computer or a function expansion unit connected to the computer, the case where a CPU or the like provided in the function expansion board or the function expansion unit executes a part or an entirety of the actual processes on the basis of the instructions of the program code and the above-mentioned functions of the embodiments are realized with the processes, is of course within the scope of the present invention.

The present invention is not construed as limiting the above-mentioned embodiments, various modifications may be adopted on the basis of the gist of the present invention, and those modifications are not intended to be excluded from the scope of the present invention.

Exemplary Embodiments Modes

A description has been given of various examples and embodiments of the present invention, and those skilled in the art should understand that the gist and the range of the present invention are not limited to the specific description in this specification. Nevertheless, in an attempt to describe the numerous alternative embodiment and variants of the present invention of which have not already been described above, numerous embodiment modes are still yet further provided, and are of course within the scope of the present invention. Hereinafter, the embodiment modes A to R will be described.

Embodiment Mode A

A warning output system for outputting a warning about supporting a consumable component used in an image forming apparatus, including a first obtaining unit for obtaining inherent information on the consumable component used in the image forming apparatus; a second obtaining unit for obtaining current time information; and a warning control for performing a warning process on the basis of the consumable component inherent information obtained by the first obtaining unit and the current time information obtained by the second obtaining unit.

As a result, it is possible to appropriately notify the user of the discontinuation information on the consumable goods used in the image forming apparatus at an appropriate timing.

Embodiment Mode B

A data processing device capable of communicating with an image forming apparatus, including a storage unit for storing service information including a service period for a consumable component consumed along with image formation of the image forming apparatus (for example, the CRG memory 21 shown in FIG. 4); a determining unit for determining whether or not a status information notification timing for the consumable component read from the storage unit is in a particular period of the support period (Steps S1001 to S1004 shown in FIG. 14); and a control unit for changing a content of consumable component information that should be notified on the basis of a determination result of the determining unit (for example, as shown in FIG. 8, when the CPU 415 is notified of the TL in the events 801 to 804, the change process is performed on the content that the user is notified of, depending on whether or not the period is in the particular period (the consumable goods discontinuation notification timing, the consumable goods discontinuation timing, or the like is notified)).

As a result, it is possible to notify the user of the consumable agent discontinuation timing along with the replacement of the consumable component at an appropriate timing when the timing for detecting the toner low is in the support period of the consumable agent and also in the particular period, thereby allowing the user to recognize that effect.

Embodiment Mode C

The data processing device according to Embodiment Mode B wherein the control unit notifies the user of first consumable component information indicating a replacement timing of the consumable component (TL notification) when it is determined that the status information notification timing for the consumable component from the image forming apparatus is not in the particular period of the support period (between the events 801 to 803 shown in FIG. 8), and notifies the user of second consumable component information indicating the replacement timing of the consumable component and production discontinuation information on the consumable component when it is determined that the status information notification timing for the consumable component from the image forming apparatus is in the particular period of the support period (between the events 803 and 804 shown in FIG. 8).

As a result, it is possible to notify the user that the consumable agent replacement request timing is in the consumable component production discontinuation period when applicable each time the consumable agent replacement request is issued.

Embodiment Mode D

The data processing device according to Embodiment Mode B, further including an obtaining unit for obtaining the consumable component information (the user PC 104 shown in FIG. 1 obtains the information from the nonvolatile memory 103 or the manufacturer server 105), wherein the obtaining unit obtains the consumable component information from a storage section provided to the consumable component or a server device on a network.

As a result, it is possible to appropriately notify the user of the consumable component production discontinuation by ensuring the obtainment of the consumable component information from the printer or the manufacturer server.

Embodiment Mode E

The data processing device according to Embodiment Mode D, wherein the obtaining unit obtains the consumable component information from the server device on the basis of a customer ID for identifying a customer included in the service information.

As a result, the consumable component information of the image forming apparatus in accordance with the customer ID can be automatically obtained.

Embodiment Mode F

The data processing device according to Embodiment Mode D, further including an output unit for outputting notification information for supporting consumable component purchase by the user on the basis of the consumable component information obtained by the obtaining unit (for example, the output device 204 shown in FIG. 2).

As a result, by displaying the thus obtained information to the user, the important information such as the support end of the consumable agent scheduled by the manufacturer can be notified.

Embodiment Mode G

The data processing device according to Embodiment Mode B, wherein the notification information includes the consumable component order information, collection information, purchase spot information, and production discontinuation information.

As a result, the manufacturer can notify the user of the arrangement of the consumable component, the collection method, the production discontinuation, and the like at the same time, thereby improving the convenience for the user.

Embodiment Mode H

The data processing device according to Embodiment Mode B, wherein the determining unit can determine whether or not the status information notification timing for the consumable component is in the particular period of the support period on the basis of a use history of the consumable component and the current time.

As a result, regarding the users with different use frequencies, for example, even when the replacement of the consumable agent is never conducted but this moment is already in the particular period, it is possible to notify the user that this moment is already is in the consumable agent discontinuation period.

Embodiment Mode I

A consumable agent information notification method for outputting a warning related to a support for a consumable component used in an image forming apparatus, including a first obtaining step of obtaining inherent information on the consumable component used in the image forming apparatus; a second obtaining step of obtaining current time information; and a warning control step of performing a warning process on the basis of the consumable component inherent information obtained in the first obtaining step and the current time information obtained in the second obtaining step.

As a result, it is possible to appropriately notify the user of the discontinuation information on the consumable goods used in the image forming apparatus at an appropriate timing.

Embodiment Mode J

A consumable agent information notification method used in a data processing device which is capable of communicating with an image forming apparatus and which is provided with storage unit for storing service information including a service period for a consumable component consumed along with image formation of the image forming apparatus, the consumable agent information notification method including a determining step of determining whether or not a status information notification timing for the consumable component read from the image forming apparatus is in a particular period of the support period (Step S1001 to S1004 shown in FIG. 14); and a control step of changing a content of consumable component information that should be notified on the basis of a determination result in the determining step (for example, as shown in FIG. 8, when the CPU 415 is notified of the TL in the events 801 to 804, the change process is performed on the content that the user is notified of, depending on whether or not the period is in the particular period (the consumable goods discontinuation notification timing, the consumable goods discontinuation timing, or the like is notified)).

As a result, the same effects as those in Embodiment Mode A can be expected.

Embodiment Mode K

The consumable agent information notification method according to Embodiment Mode J, wherein the control step notifies the user of first consumable component information indicating a replacement timing of the consumable component when it is determined that the status information notification timing for the consumable component from the image forming apparatus is not in the particular period of the support period, and notifies the user of second consumable component information indicating the replacement timing of the consumable component and production discontinuation information on the consumable component when it is determined that the status information notification timing for the consumable component from the image forming apparatus is in the particular period of the support period.

As a result, the same effects as those in Embodiment Mode B can be expected.

Embodiment Mode L

The consumable agent information notification method according to Embodiment Mode J, further including an obtaining step of obtaining the consumable component information, wherein the obtaining step obtains the consumable component information from a storage section provided to the consumable component or a server device on a network.

As a result, the same effects as those in Embodiment Mode C can be expected.

Embodiment Mode M

The consumable agent information notification method according to Embodiment Mode L, wherein the obtaining step obtains the consumable component information from the server device on the basis of a customer ID for identifying a customer included in the service information.

As a result, the same effects as those in Embodiment Mode E can be expected.

Embodiment Mode N

The consumable agent information notification method according to Embodiment Mode L, further including an output step of outputting notification information for supporting consumable component purchase by the user on the basis of the consumable component information obtained in the obtaining step.

As a result, the same effects as those in Embodiment Mode F can be expected.

Embodiment Mode O

The consumable agent information notification method according to Embodiment Mode J, wherein the notification information includes the consumable component order information, collection information, purchase spot information, and production discontinuation information.

As a result, the same effects as those in Embodiment Mode G can be expected.

Embodiment Mode P

The consumable agent information notification method according to Embodiment Mode J, wherein the determination step can determine whether or not the status information notification timing for the consumable component is in the particular period of the support period on the basis of a use history of the consumable component and the current time.

As a result, the same effects as those in Embodiment Mode H can be expected.

Embodiment Mode Q

A computer-readable storage medium storing a program file for executing the consumable agent information notification method according to any one of Embodiment Modes I to P.

As a result, the same effects as those in Embodiment Modes I to P can be expected.

Embodiment Mode R

A program for causing a computer to execute the consumable agent information notification method according to any one of Embodiment Modes I to P.

As a result, the same effects as those in Embodiment Modes I to P can be expected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-175187 filed Jun. 15, 2005, which is hereby incorporated by reference herein in its entirety.

What is claimed is:

1. A data processing device configured to output a warning about supporting a consumable component used in an image forming apparatus, the device comprising:

a first obtaining unit that obtains information on time for a manufacture discontinuation of the consumable component used in the image forming apparatus after a lapse of a predetermined period from a manufacture discontinuation of the image forming apparatus;

a second obtaining unit that obtains current time information;

a determining unit that determines whether or not frequency of use of the image forming apparatus is high; and a warning controller that, outputs a warning of a manufacture discontinuation of the consumable component when the time reaches a timing occurrence for warning of the remaining amount of the consumable component and manufacture discontinuation periods and the determining unit determines that the frequency of use of the image forming apparatus is high, or when a predetermined time passes after a previous warning, the time reaches the manufacture discontinuation periods, and the determining unit determines that the frequency of use of the image forming apparatus is not high, and does not output a warning of a manufacture discontinuation of the consumable component when the time does not reach the timing occurrence for warning of the remaining amount of the consumable component, even though the time reaches the manufacture discontinuation notification periods, or before the predetermined time passes after the previous warning even though the time reaches the manufacture discontinuation notification periods and when the determining unit determines that the frequency of use of the image forming apparatus is not high, wherein the manufacture discontinuation notification periods are determined on the basis of the information on the manufacture discontinuation of the consumable component and the current time information.

2. The data processing device according to claim 1, further comprising an update unit that updates the information on the manufacture discontinuation of the consumable component, wherein the warning controller outputs the warning of the consumable component on the basis of the updated information on the manufacture discontinuation of the consumable component and the current time information.

3. The data processing device according to claim 2, further comprising a determining unit that determines print frequency, wherein the warning controller outputs the warning of the consumable component on the basis of the updated information on the manufacture discontinuation of the consumable component, the current time information and the print frequency.

4. A consumable information notification method for outputting a warning related to a support for a consumable component used in an image forming apparatus, the method including:

obtaining information on time for a manufacture discontinuation of the consumable component used in the image forming apparatus after a lapse of a predetermined period from a manufacture discontinuation of the image forming apparatus;

obtaining current time information;

determining whether or not frequency of use of the image forming apparatus is high;

outputting a warning of a manufacture discontinuation of the consumable component when the time reaches a timing occurrence for warning of the remaining amount of the consumable component and manufacture discontinuation periods, and determining that the frequency of use of the imaging forming apparatus is high, or when a predetermined time passes after a previous warning, the time reaches the manufacture discontinuation periods, and the determining unit determines that the frequency of use of the image forming apparatus is not high; and not outputting a warning of a manufacture discontinuation of the consumable component when the time does not reach the timing occurrence for warning of the remaining amount of the consumable component, even though the time reaches the manufacture discontinuation notification periods, or before the predetermined time passes after the previous warning even though the time reaches the manufacture discontinuation notification periods and when the determining unit determines that the frequency of use of the image forming apparatus is not high, wherein the manufacture discontinuation notification periods are determined on the basis of the information on the manufacture discontinuation of the consumable component and the current time information.

5. The consumable information notification method according to claim 4, further including updating the information on the manufacture discontinuation of the consumable component, wherein the outputting step outputs the warning of the consumable component on the basis of the updated information on the manufacture discontinuation of the consumable component and the current time information.

6. The consumable information notification method according to claim 5, further including determining print frequency, wherein the outputting step outputs the warning of the consumable component on the basis of the updated information on the manufacture discontinuation of the consumable component, the current time information and the print frequency.

7. A computer-readable storage medium containing computer-executable instructions for executing consumable agent information notification in an image forming apparatus, the medium comprising:

computer-executable instructions for obtaining information on time for a manufacture discontinuation of the consumable component used in the image forming apparatus after a lapse of a predetermined period from a manufacture discontinuation of the image forming apparatus;

computer-executable instructions for obtaining current time information;

computer-executable instructions for determining whether or not frequency of use of the image forming apparatus is high;

computer-executable instructions for outputting a warning of a manufacture discontinuation of the consumable component when the time reaches a timing occurrence for warning of the remaining amount of the consumable component and manufacture discontinuation periods, and determining that the frequency of use of the imaging forming apparatus is high, or when a predetermined time passes after a previous warning, the time reaches the manufacture discontinuation periods, and the determining unit determines that the frequency of use of the image forming apparatus is not high; and computer-executable instructions for not outputting a warning of a manufacture discontinuation of the consumable component when the time does not reach the timing occurrence for warning of the remaining amount of the consumable component, even though the time reaches the manufacture discontinuation notification periods, or before the predetermined time passes after the previous warning even though the time reaches the manufacture discontinuation notification periods and when the determining unit determines that the frequency of use of the image forming apparatus is not high, wherein the manufacture discontinuation notification periods are determined on the basis of the information on the manufacture discontinuation of the consumable component and the current time information.

8. The computer-readable storage medium according to claim 7, further including computer-executable instructions for updating the information on the manufacture discontinuation of the consumable component, wherein the outputting includes outputting the warning of the consumable component on the basis of the updated information on the manufacture discontinuation of the consumable component and the current time information.

9. The computer-readable storage medium according to claim 8, further including computer-executable instructions for determining print frequency, wherein the outputting includes outputting the warning of the consumable component on the basis of the updated information on the manufacture discontinuation of the consumable component, the current time information and the print frequency.

10. A data processing device capable of communicating with an image forming apparatus, the device comprising:

an obtaining unit that obtains status information on time for indicating a consumption status of a consumable component used in the image forming apparatus after a lapse of a predetermined period from a manufacture discontinuation of the image forming apparatus;

a determining unit that determines whether or not frequency of use of the image forming apparatus is high; and a notification unit that, notifies the manufacture discontinuation of the consumable component when the time reaches a timing occurrence for warning of the remaining amount of the consumable component and manufacture discontinuation notification periods and the determining unit determines that the frequency of use of the image forming apparatus is high, or when a predetermined time passes after a previous warning, the time reaches the manufacture discontinuation periods, and the determining unit determines that the frequency of use of the image forming apparatus is not high, and does not notify the manufacture discontinuation of the consumable component when the time does not reach a timing occurrence for warning of the remaining amount of the consumable component even though the time reaches the manufacture discontinuations notification periods, or before the predetermined time passes after the previous warning even though the time reaches the manufacture discontinuation notification periods and when the determining unit determines that the frequency of use of the image forming apparatus is not high, wherein the timing occurrence of warning of the remaining amount of the consumable component is determined based on the status information.

11. The data processing device according to claim 10, wherein the obtaining unit obtains support information from a server on a network.

12. The data processing device according to claim 11, further comprising a transmitting unit that transmits a user ID for identifying a user to the server in accordance with the status information, wherein the obtaining unit obtains the support information from the server on the basis of the user ID.

13. The data processing device according to claim 10, wherein the support information includes manufacture discontinuation information indicating a manufacture discontinuation timing of the consumable component.

14. The data processing device according to claim 13, wherein the support information includes at least one of distribution outlet information of the consumable component, collection information indicating a method of collection procedure for collecting the consumable component, and product information for performing direct purchase of the consumable component on a website.

15. A control method for a data processing device capable of communicating with an image forming apparatus, the method including:

obtaining status information on time for indicating a consumption status of a consumable component used in the image forming apparatus after a lapse of a predetermined period from a manufacture discontinuation of the image forming apparatus;

determining whether or not frequency of use of the image forming apparatus is high;

notifying the manufacture discontinuation of the consumable component when the time reaches a timing occurrence for warning of the remaining amount of the consumable component and manufacture discontinuation notification periods, and determining that the frequency of use of the imaging forming apparatus is high, or when a predetermined time passes after a previous warning, the time reaches the manufacture discontinuation periods, and the determining unit determines that the frequency of use of the image forming apparatus is not high; and not notifying the manufacture discontinuation of the consumable component when the time does not reach a timing occurrence for warning of the remaining amount of the consumable component even though the time reaches the manufacture discontinuations notification periods, or before the predetermined time passes after the previous warning even though the time reaches the manufacture discontinuation notification periods and when the determining unit determines that the frequency of use of the image forming apparatus is not high, wherein the timing occurrence of warning of the remaining amount of the consumable component is determined based on the status information.

16. A computer-readable storage medium containing computer-executable instructions for controlling a data processing device capable of communicating with an image forming apparatus, the medium comprising:

computer-executable instructions for obtaining status information on time for indicating a consumption status of a consumable component used in the image forming apparatus after a lapse of a predetermined period from a manufacture discontinuation of the image forming apparatus;

computer-executable instructions for determining whether or not frequency of use of the image forming apparatus is high;

computer-executable instructions for notifying the manufacture discontinuation of the consumable component when the time reaches a timing occurrence for warning of the remaining amount of the consumable component and manufacture discontinuation notification periods, and determining that the frequency of use of the imaging forming apparatus is high, or when a predetermined time passes after a previous warning, the time reaches the manufacture discontinuation periods, and the determining unit determines that the frequency of use of the image forming apparatus is not high; and computer-executable instructions for not notifying the manufacture discontinuation of the consumable component when the time does not reach a timing occurrence for warning of the remaining amount of the consumable component even though the time reaches the manufacture discontinuations notification periods, or before the predetermined time passes after the previous warning even though the time reaches the manufacture discontinuation notification periods and when the determining unit determines that the frequency of use of the image forming apparatus is not high, wherein the timing occurrence of warning of the remaining amount of the consumable component is determined based on the status information.

* * * * *